(12) United States Patent
Pearson

(10) Patent No.: US 7,512,981 B2
(45) Date of Patent: Mar. 31, 2009

(54) METHOD AND SYSTEM FOR REMOTELY CONFIGURING AND MONITORING A COMMUNICATION DEVICE

(75) Inventor: Sterling Michael Pearson, Atlanta, GA (US)

(73) Assignee: Secureworks, Inc., Atlanta, GA (US)

( * ) Notice: Subject to any disclaimer, the term of this patent is extended or adjusted under 35 U.S.C. 154(b) by 314 days.

(21) Appl. No.: 11/083,113

(22) Filed: Mar. 17, 2005

(65) Prior Publication Data

US 2005/0235360 A1  Oct. 20, 2005

Related U.S. Application Data

(63) Continuation of application No. 09/469,586, filed on Dec. 22, 1999, now Pat. No. 6,990,591.

(51) Int. Cl.
G06F 21/00 (2006.01)
(52) U.S. Cl. .................................................. 726/23
(58) Field of Classification Search ................... 726/23
See application file for complete search history.

(56) References Cited

U.S. PATENT DOCUMENTS

| 5,606,668 | A | 2/1997 | Shwed |
| 5,796,942 | A | 8/1998 | Esbensen |
| 5,931,946 | A | 8/1999 | Terada et al. |
| 5,956,716 | A | 9/1999 | Kenner et al. |

(Continued)

FOREIGN PATENT DOCUMENTS

EP  793170 A1  9/1997

WO  WO 98 26548  6/1998

OTHER PUBLICATIONS

Jai Sundar Balasubramaniyan, Jose Ovar Garcia-Fernandez, David Isacoff, Eugene Spafford, and Diego Zamboni. An architecture for intrusion detection using Autonomous Agents. *COAST Technical Report* May 1998, COAST Laboratory, Department of Computer Sciences, Purdue University, West Lafayette, IN 47907-1398, Jun. 1998.

(Continued)

*Primary Examiner*—Andrew L Nalven
(74) *Attorney, Agent, or Firm*—King & Spalding LLP

(57) ABSTRACT

Methods and systems for remotely configuring and monitoring a communication device are provided, especially useful in a computer network environment such as the Internet. A communication device or network appliance compares communications entering the communication device to a list of communication types established as known security risks, for example hacker attacks, unauthorized attempted access to network resources, or similar network security threats. If the received communication corresponds to a known security risk, the communication is classified as either a high security risk or low security risk, and an alert signal is transmitted to a remote monitoring center. Upon receiving the alert signal, the remote monitoring center assigns a priority to the alert signal based upon the type of the communication that triggered the transmission of the alert signal. Based on the assigned priority, the prioritized alert signal is then forwarded to a remote monitoring agent for resolution. The remote monitoring agent may then analyze the communication, contact the end user of the communication device with an appropriate resolution, or take other appropriate action in response to the received communication. The communication device may also be remotely configured.

20 Claims, 11 Drawing Sheets

U.S. PATENT DOCUMENTS

| | | | |
|---|---|---|---|
| 5,991,881 A | 11/1999 | Conklin et al. | 713/201 |
| 6,012,088 A | 1/2000 | Li et al. | |
| 6,012,100 A | 1/2000 | Frailong et al. | |
| 6,088,804 A | 7/2000 | Hill et al. | |
| 6,119,109 A | 9/2000 | Muratani et al. | |
| 6,119,236 A | 9/2000 | Shipley | |
| 6,158,010 A | 12/2000 | Moriconi et al. | |
| 6,226,372 B1 | 5/2001 | Beebe et al. | |
| 6,289,201 B1 | 9/2001 | Weber et al. | |
| 6,301,668 B1 | 10/2001 | Gleichauf et al. | |
| 6,324,692 B1 | 11/2001 | Fiske | |
| 6,484,315 B1 | 11/2002 | Ziese | |
| 6,530,024 B1 * | 3/2003 | Proctor | 726/23 |
| 6,560,611 B1 * | 5/2003 | Nine et al. | 707/104.1 |
| 6,725,377 B1 * | 4/2004 | Kouznetsov | 726/23 |
| 6,990,591 B1 * | 1/2006 | Pearson | 726/22 |

OTHER PUBLICATIONS

"Network Security Wizards" (visited Oct. 27, 1999) http://www.securitywizards.com.

"CyberCop Monitor" (visited Oct. 29, 1999) http://nai.com/asp_set/products/tns/ccomonitor_features.asp.

"Axent: Security That Means Business" (visited Oct. 27, 1999) http://www.axent.com.

"NFR Intrusion Detection Appliance" (visited Oct. 27, 1999) http://www.nfr.net/products/ida-facts.html.

"ISS SAFEsuite Products" (visited Oct. 27, 1999) http://www.iss.net/prod/rs.php3.

Greg Shipley, "Intrusion Detection" Networking Computing, Nov. 15, 1999, pp. 48, 50, 52, 56, 58, 60, 66, 68, 74-75.

Roesch, Martin, "Snort-Lightweight Intrusion Detection for Networks", no date.

Haixin Duan, Jianping Wu, "Security Management for Large Computer Networks", APCC/OECC '99 Proceedings, 1999, pp. 1208-1213.

Joanna Makris, "More Bark Than Bite", Data Communications, Mar. 1999, pp. 37-42, 44, 46, 48, 50.

International Search Report, PCT/US 00/31395, European Patent Office, Sep. 4, 2001.

Internet Security Systems, RealSecure Frequently Asked Questions, Nov. 8, 1999, pp. 1-14, http://www.iss.net/prod/tpo/rs_faq.php3.

Internet Security Systems, Host Security Rating Detail, Nov. 9, 1998, pp. 1-11.

Internet Security Systems, Coordinated Attack Single Source, Dec. 2, 1998, p. 1.

Internet Security Systems, RealSecure Frequently Asked Questions, Oct. 29, 1999, pp. 1-14, http://www.iss.net/prod/tpo/rs_faq.php3.

Internet Security Systems, Information Security: A Changing Need, Oct. 27, 1999, pp. 1-9, http://www.iss.net/about/about.php3.

Internet Security Systems, ISS Ships New Version of RealSecure, Provides Industry-First Solution for Comprehensive E-Business Server Protection, Oct. 29, 1999, pp. 1-3, News Release, http://www.iss.net/press_rel/pr3.php3.

Internet Security Systems, ISS SAFEsuite products, RealSecure Agent, Oct. 29, 1999, p. 1, http://www.iss.net/prod/rsagent.php3.

Internet Security Systems, ISS SAFEsuite products, RealSecure Manager, Oct. 29, 1999, p. 1, http://www.iss.net/prod/rsmanager.php3.

Internet Security Systems, ISS SAFEsuite products, RealSecure Engine, Oct. 27, 1999, p. 1, http://www.iss.net/prod/rsengine.php3.

Phillips, NetProwler detects perimeter hack attacks, Jul. 5, 1999, pp. 1-3, Ziff-Davis Publishing Company, Reprinted from PC Week, http://www.zdnet.com/adverts/eprints/axent/pcwk/90803kp.html.

Axent, Net Prowler Integration Module for the Raptor Firwall 6.x, Oct. 27, 1999, p. 1, http://www.raptor.com/cs/FAQ/netprowler.html.

Network Security Wizards, Dragon Products, Oct. 29, 1999, p. 1, http://www.securitywizards.com/product.html.

* cited by examiner

| HEADER 810 | | | BODY 820 | |
|---|---|---|---|---|
| IP ADDRESS | PORT# | MESSAGE | CONTENT | PRIORITY |
| 10.23.23.23 | 23 | Any | Any | 11 |
| 10.23.23.23 | 23 | TELNET-LOGININCORRECT | LOGIN INCORRECT | 11 |
| 10.23.23.23 | 23 | TELNET-NOTONCONSOLE | NOT ON SYSTEM CONSOLE | 11 |
| 10.23.23.23 | 23 | LIVINGSTON-DOS | |FFF3 FFF3 FFF3 FFF3| | 11 |
| 10.23.23.23 | 23 | WINGATE-ACTIVE | WINGATE> | 11 |
| 10.23.23.23 | 25 | SMTP-VRFY-DECODE | VRFY DECODE | 00 |
| 10.23.23.23 | 25 | SMTP-EXPN-DECODE | EXPN DECODE | 00 |
| 10.23.23.23 | 25 | SMTP-EXPN-ROOT | EXPN ROOT | 01 |
| 10.23.23.23 | 80 | FRONTPAGE-SERVICE.PWD | VTI_PVT/SERVICE.PWD | 01 |
| 10.23.23.23 | 80 | FRONTPAGE-USERS.PWD | VTI_PVT/USERS.PWD | 01 |
| 10.23.23.23 | 80 | FRONTPAGE-AUTHORS.PWD | VTI_PVT/AUTHORS.PWD | 11 |
| 10.23.23.23 | 80 | FRONTPAGE-ADMINISTRATORS.PWD | VTI_PVT/ADMINISTRATORS.PWD | 00 |
| 10.23.23.23 | 80 | FRONTPAGE-SHTML.EXE | VTI_PVT/SHTML.EXE | 00 |
| 10.23.23.23 | 80 | COLDFUSION-OPENFILE | CFDOCS/EXPELVAL/OPENFILE.CFM | 11 |
| 10.23.23.23 | 80 | COLDFUSION-EXPRCALC | CFDOCS/EXPELVAL/EXPRCALC.CFM | 11 |
| 10.23.23.23 | 21 | FTP-NOPASSWORD | PASS |0d| | 11 |
| 10.23.23.23 | 21 | FTP-LINUX-NULL USER | USER NULL|0d| | 11 |
| 10.23.23.23 | 21 | FTP-CWD~ROOT | CWD ~ROOT | 11 |
| 10.23.23.23 | 21 | FTP-RHOSTS | RHOSTS | 11 |
| 10.23.23.23 | 21 | FTP-PASSWD | PASSWD | 11 |
| 10.23.23.23 | 21 | FTP-BAD-LOGIN | 530 LOGIN INCORRECT | 11 |
| ... | ... | ... | ... | ... |
| 10.23.23.23 | 21 | FTP-USER-ROOT | USER ROOT|0d| | 11 |

Fig. 9

METHOD AND SYSTEM FOR REMOTELY CONFIGURING AND MONITORING A COMMUNICATION DEVICE

CROSS REFERENCE TO RELATED APPLICATION

This application is a continuation of and claims priority to U.S. application Ser. No. 09/469,586 filed Dec. 22, 1999 now U.S. Pat. No. 6,990,591, entitled, "Method and System for Remotely Configuring and Monitoring a Communication Device", the entire contents of which are hereby incorporated by reference.

TECHNICAL FIELD

The present invention relates generally to computer network security, and more particularly relates to methods and systems for remotely monitoring the security status of a computer network and remotely configuring communication devices connected to a computer network.

BACKGROUND OF THE INVENTION

The rapid increase in the number of burglaries and trespasses has fueled a growing demand for adequate protection against break-ins. Because traditional locks and deadbolts can easily be circumvented, they are largely ineffective against determined burglars and vandals. Remotely monitored security systems typically provide intrusion protection by constantly monitoring the security status of a property. In a remotely monitored security system, sensors are strategically placed throughout the home or business to detect potential break-ins. If the sensors detect a breach of entry, or movement within the premises, the security system independently transmits an alert to a remote monitoring center. Security personnel located at the remote monitoring center may then respond with appropriate action, such as notifying individuals listed on an emergency contact list or dispatching the police or fire department. This type of constantly monitored security system offers a great deal of security and peace of mind to a property owner with minimal owner involvement.

Similarly, computer network owners would appreciate the peace of mind offered by security systems that remotely monitor their networks for "break-ins." Like the property owner who suffers from break-ins by burglars and vandals, computer network owners experience similar types of "break-ins" by computer trespassers known as "hackers." As global computer networks such as the Internet and its underlying technologies have become increasingly familiar, hackers have acquired unprecedented opportunities to gain unauthorized access to data, misappropriate sensitive material, destroy or corrupt important files, make unauthorized use of computer resources, interfere with the intended use of computer resources, etc. As experience has shown, the realm of cyberspace—like the realm of real property—has its share of criminals, resulting in a similar demand for adequate protection against "break-ins."

Traditionally, network owners have utilized firewalls to shield their data and resources from the potential ravages of hackers. In essence, a "firewall" is an electronic device or programmed computer system that functions to regulate the flow of data between two networks. All communications that flow between the networks in either direction must pass through the firewall; otherwise, unwanted non-complying communications may circumvent security. A firewall, which is typically located at a network gateway server, selectively permits the communications to pass from one network to the other. Thus, a firewall acts as a single point of entry to a network where all traffic may be audited, authorized, and authenticated.

Traditional firewalls, however, suffer from serious drawbacks. For example, they generally require extensive monitoring by a skilled individual. That individual must determine whether communications that have failed firewall authentication are attacks upon the network or merely false alarms. In most situations, skilled support personnel must be on-site to perform these tasks. Moreover, the support personnel must analyze each potential attack to determine whether the current firewall protection is adequate or whether it requires fine-tuning. Such determinations can be difficult even for trained technicians. Untrained individuals and small businesses often cannot perform these tasks themselves, and also may not be able to afford the expense of hiring trained on-site personnel.

Another drawback of traditional network firewalls is that many firewalls are expensive and require extensive technical resources for setup and configuration. While larger organizations often have management information systems (MIS) personnel dedicated to installing and configuring the organization's firewalls and other network equipment, smaller organizations and individuals may be unable to perform such tasks. Configuring a firewall can often be a daunting task, even for a trained technician. Despite these drawbacks and the increased occurrence of computer network break-ins, prior to the present invention the peace of mind offered by remotely monitored security systems in the real property world does not exist for computer network owners.

Therefore, in light of these problems, there is a need for methods and systems for remotely monitoring communication devices, such as firewalls, for security threats or breaches with little or no end user involvement. There is a further need for methods and systems that can respond to potential security breaches at the communication device without end user intervention. There is an additional need for the ability to remotely configure such communication devices to make them operative, again with little or no end user involvement.

SUMMARY OF THE INVENTION

The present invention solves the problems described above by providing methods and systems for remotely configuring and monitoring a communication device, for example a firewall, an intrusion detection device, or similar Internet appliance. According to another aspect of the invention, a communication device such as a firewall can be configured for operation from a remote location, with virtually no end user participation. In addition, the present invention permits rapid response to potential security breaches received at the communication device, without the need for end user intervention.

Generally described, the present invention provides methods for protecting a computer network through a communication device that is capable of determining whether a communication entering the communication device poses a potential security risk to the network or devices on the network. If the communication device determines that such a communication has been received, the device transmits an alert signal to a remote monitoring center. The remote monitoring center then evaluates the alert and determines how to handle the communication.

More specifically described, a communication device compares incoming communications to entries on a list of communication types established as known security risks. If the incoming communication corresponds to one of the known security risks, the communication device classifies the communication as either a high security risk or low security risk. The reader should appreciate, however, that additional classes of risk may also be included, such as a medium security class. If the communication is found to be a security risk, the communication device transmits an alert signal to a remote monitoring center. Based upon the immediacy of the threat that the communication poses to the network, the communication device takes an appropriate action, for example terminating the communication, prior to contacting the remote monitoring center. In addition, the communication device may also determine and transmit the type of communication causing the alert to the remote monitoring center for analysis and handling.

Upon receiving an alert signal, the remote monitoring center assigns a priority to the alert signal based upon an end user's predetermined stored preferences and the type of communication that caused the alert signal. Based upon that assigned priority, the remote monitoring center then forwards the prioritized alert signal to a computer or human monitoring agent, or may take other appropriate action. The monitoring agent may then analyze the communication and take appropriate action, contact the end user of the communication device with an appropriate resolution, or take other appropriate action.

According to another aspect of the present invention, a communication device, such as a network firewall, an intrusion detection apparatus, or other similar network appliance, may be remotely configured for operation. According to these aspects of the invention, the communication device first determines its own address on a computer network. The communication device then transmits a wake-up signal to a remote computer, the wake-up signal comprising the determined network address and its unique identification number, which distinguishes that communication device from other devices. The remote computer receives the wake-up signal and configures the communication device by transmitting predetermined configuration information to the device at the previously transmitted network address. The predetermined configuration information is then loaded into the communication device so as to make the device operate in accordance with the configuration information.

According to another aspect of the invention, a user may access a world-wide-web ("WWW" or "web") site maintained at a remote computer and make a request to initiate a remote configuration of the user's communication device. The user provides a unique identification number assigned to the user's communication device and selects a group of configuration options for that device. In response to receiving the unique identification number and request to configure, the remote computer compares that unique identification number with a comprehensive list of recorded valid identification numbers. If a match is found, the remote computer transmits configuration information to the communication device, which is located at the network address associated with the unique identification number previously provided by the user.

According to yet another aspect of the invention, a communication device such as a firewall or other network device can be maintained in an up-to-date status by receiving updated software from a remote computer system, automatically and without user intervention. In accordance with this aspect of the invention, a communication device determines its network address on power-up. The communication device may also at that time activate basic firewall intrusion detection policies to ensure a base level of network security. The communication device then transmits, via an encrypted network channel, communication device status information via a "wake-up" signal, to a remote computer. The wake-up signal comprises the communication device's network address, unique identification number, and status information regarding the device's operational status.

The remote computer receives that wake-up signal and records the information in a database. Based upon the received status information, the remote computer then determines whether the communication device requires a software update. If the device requires such a software update, the remote computer queues any necessary software patches for later download to the communication device.

The remote computer retains the queued software patches until it receives a request to configure the communication device. The request to configure can be received as a request provided by a user from his or her computer system via the Internet, automatically at predetermined intervals, or as a request provided by a technician or security personnel. Predetermined configuration information, which may include these queued software patches, is transmitted to the communication device in response to receiving that request to configure. Upon receiving the request to configure, the remote computer transmits the configuration information to the communication device via an encrypted channel. The configuration information may include the correct time, activation codes, and any necessary software patches, such as the queued software patches described above.

The communication device receives and applies the configuration information and transmits a configuration complete signal to the remote computer. In response to receiving the configuration complete signal, the remote computer records an indication of a successful configuration in a database, and may perform a vulnerability analysis on the communication device. This analysis determines whether the communication device has been configured properly. If the communication device passes the vulnerability analysis, a notice is sent to a user of the communication device (for example, by posting information at a user-accessible WWW site) that the communication device is properly configured and active. However, if the communication device fails the vulnerability analysis, the user may receive a request to modify the device's configuration information.

In this manner, the present invention advantageously provides various methods and systems for monitoring and configuring a communication device. That the present invention improves over the drawbacks of the prior art and accomplishes the objects of the invention will become apparent from the detailed description of the illustrative embodiments to follow.

BRIEF DESCRIPTION OF THE DRAWINGS

FIG. 9 is a list exemplary attack signatures as utilized in the present invention.

DETAILED DESCRIPTION

The present invention is directed toward systems and methods for remotely monitoring and remotely configuring a communication device, such as a network firewall, network security device, or other computer network communication device. Aspects of the present invention may be embodied in a communication device operating within a distributed or networked computing environment. In an illustrative embodiment of the present invention, the communication device comprises a remotely configurable and monitorable firewall intrusion detection appliance. As described above, a firewall protects the resources of a private network from outside communications received from other networks. For instance, an organization utilizing a network through which users may gain access to the entire Internet may install a firewall to prevent outsiders from accessing its own private resources.

Although illustrative embodiments of the present invention will be generally described in the context of a communication device operating as a firewall and having intrusion detection functionality within a network environment, those skilled in the art will recognize that aspects of the present invention may be implemented to remotely configure and remotely monitor other types of network devices. Accordingly, the term "communication device" as used herein means any type of data communication device that can be connected to a computer network and is operative to transmit and/or receive data communications. Specifically, the term also contemplates devices called network or Internet "appliances", that is, devices that connect to a computer network for the purposes of gathering (inputting), storing, displaying, processing, and/or providing (outputting) information.

Illustrative Operating Environment

Figure 1:
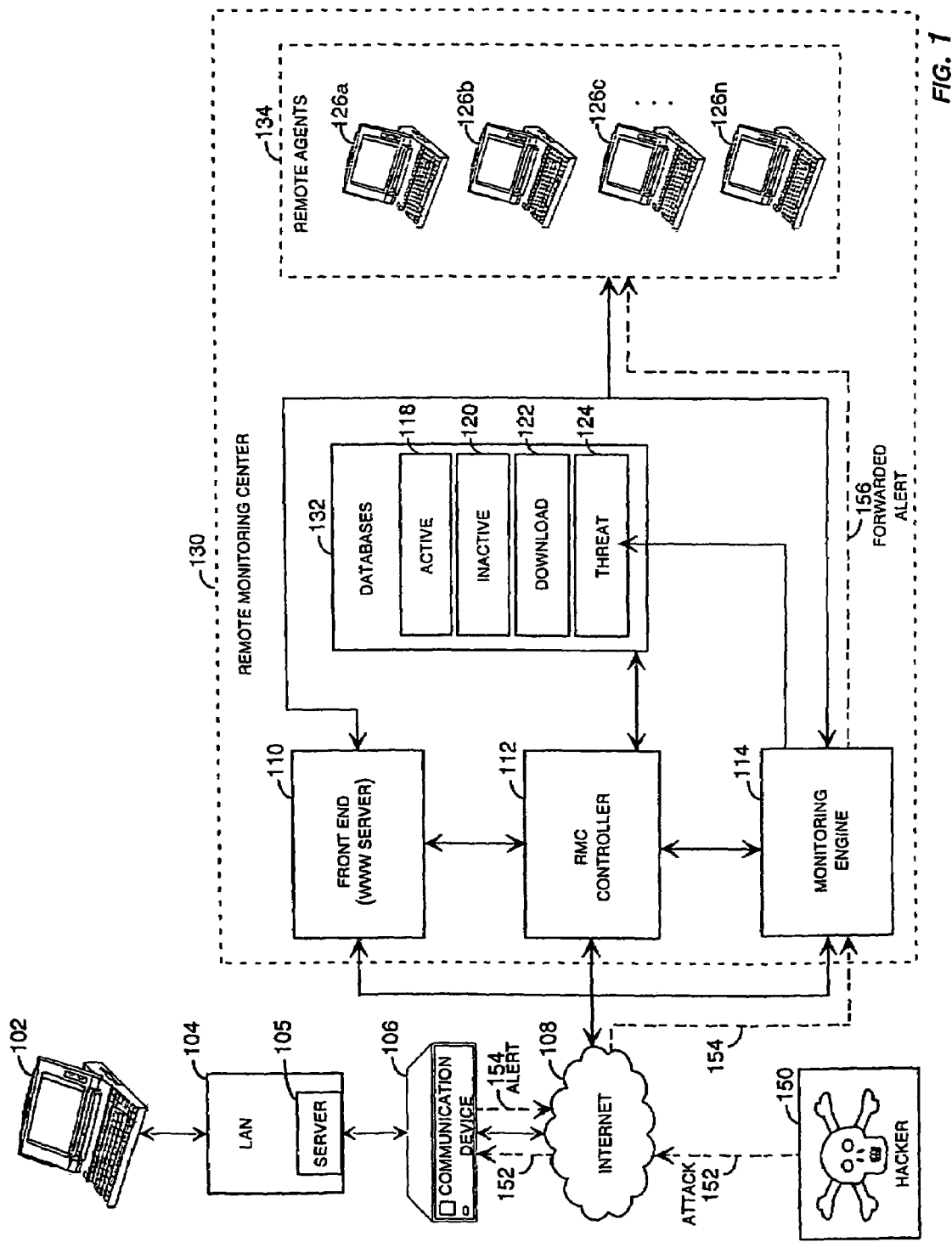
FIG. 1 is a block diagram of an illustrative operating environment for implementing aspects of the present invention.

Referring now to the drawings, in which like numerals represent like elements throughout the several figures, aspects of the present invention and the illustrative operating environment will be described. FIG. 1 and the following discussion is intended to provide a description of a suitable environment in which the methods of the invention may be implemented and of the architecture of a preferred embodiment of the invention as a system.

Aspects of the present invention may be implemented in a distributed computing environment such as the global computer network commonly referred to as the "Internet" 108. In a distributed computing environment, a user computer such as computer 102 are be connected to one another through Local Area Networks ("LANs"), like LAN 104, through Wide Area Networks ("WANs"), or through public "backbones" such as the Internet 108. Using protocols well known to those skilled in the art, such as TCP/IP, computer 102 communicates with other computers whether they are also on LAN 104 or on the Internet 108. Moreover, computer 102 is operative to transmit and receive files and other information to and from server 105 using additional protocols well known to those skilled in the art, for example, file transfer protocol (ftp), telnet, e-mail, etc. Such networking environments are commonplace in offices, enterprise-wide computer networks, intranets, and the Internet.

Computer 102, LAN 104, and server 105 are typically connected to the Internet 108 through a communication device 106 such as gateway, firewall, or other device that communicates data between one or more ports. According to an exemplary embodiment of the present invention, communication device 106 comprises a network firewall intrusion detection appliance that is further described with reference to FIG. 2 below. The firewall and intrusion detection functionality of communication device 106 protects the resources of LAN 104 from potential hackers, such as renegade users of the Internet 108 or unauthorized users of LAN 104, by monitoring the communications received into the device 106 and determining whether such communications comprise a security risk. The general operation of the firewall and intrusion detection functionality is described below with reference to FIG. 2.

According to one aspect of the invention, communication device 106 is operative to determine whether a received communication comprises a security risk. For example, in the illustrative embodiment of the invention, a hacker 150 attempting to infiltrate LAN 104 may send LAN 104 an unwanted or "attack" communication, such as a GUEST USER LOGIN request, as represented by dashed arrows 152. Typically, such communications are sent via the Internet 108, but those skilled in the art will appreciate that such attacks may be transmitted through other means, such as a WAN or MAN (Metropolitan Area Network).

In accordance with the present invention, communication device 106 intercepts the attack from hacker 150 and transmits an alert signal, as represented by dashed arrows 154, to a remote monitoring center (RMC) 130. Again, such communications are usually sent through the Internet 108 but those skilled in the art will appreciate that any distributed network environment may be utilized to connect communication device 106 and RMC 130. The alert signal is handled by the RMC 130, as will be described next.

The remote monitoring center (RMC) 130 preferably comprises several components that provide functionality for carrying out various aspects of the invention. The RMC 130 may comprise one or more general-purpose computers running application programs for performing several tasks, as will be described. A front end server computer 110 provides an Internet WWW-accessible front end for users to access features and services of the RMC 130 and issue commands for configuration, check status of their devices and networks, and the like. An RMC controller computer 112 stores configuration and other related information about communication devices and networks serviced by the RMC, and generally controls the operations within the RMC.

A monitoring engine computer 114 receives threat communications in the form of alert signals from threatened or attacked communication devices. A database farm 132 houses a plurality of different databases that store information associated with operations of the RMC and of the various communication devices and networks serviced by the RMC. A customer service center 134 comprising a plurality of remote customer service agents 126a, 126b, . . . 126n handles incoming security threats or attacks on behalf of supported customers.

The following actions are exemplary of the manner in which the RMC 130 handles an alert signal received from a supported communication device 106. The monitoring engine 114 associated with the RMC 130 receives the alert signal from communication device 106 and forwards the alert, as represented by dashed arrow 156, to selected one of the plurality of remote agents 126a, 126b, . . . 126n. Monitoring engine 114 preferably also maintains a history of attacks on communication device 106 by recording incoming alert signals in a threat database 124 stored in the database farm.

One or more selected remote agents 126 receives the alert signal and determines an appropriate response to the attack of hacker 150, such as closing LAN 104 to all outside communication or increasing network security at the user's site. The user of the threatened or attacked communication device 106 is then preferably notified of that response. In an illustrative embodiment of the invention, the user may access the response on a computer, such as computer 102, via a WWW site maintained by the front end server 110. For example, the remote agents 126 may transmit the response to a WWW server, such as front end 110, for posting and access by the user. The user may then access that information through Internet 108 via any WWW browser application program known to those skilled in the art, such as Microsoft Corporation's INTERNET EXPLORER™ or Netscape Corporation's NAVIGATOR™ Internet browser programs.

Although the illustrative embodiment provides notification via a WWW site, the reader will appreciate that the user may be contacted in other ways, such as via e-mail, telephone, or pager.

According to another aspect of the present invention, the RMC controller 112 is operative to receive activation and configuration information from communication device 106, such as its software release version. The RMC controller 112 also preferably records that received information in one or more of the databases 118, 120, 122, and 124.

In addition, RMC controller 112 may transmit software patches and other update information to communication device 106 upon determining that communication device 106 requires such updates.

In an embodiment of the present invention, front end 110 receives requests for WWW pages communicated via a user's browser and transmits such pages to the user of communication device 106. The requested WWW pages may comprise menus and other screens with which the user may enter billing, configuration, and activation information to configure and activate his or her communication device 106.

Illustrative Embodiments of the Present Invention

With the above preface on the illustrative operating environment for embodiments of the present invention, the remaining FIGS. 2-11, which illustrate aspects of the preferred embodiment of the present invention, will be described.

Figure 2:
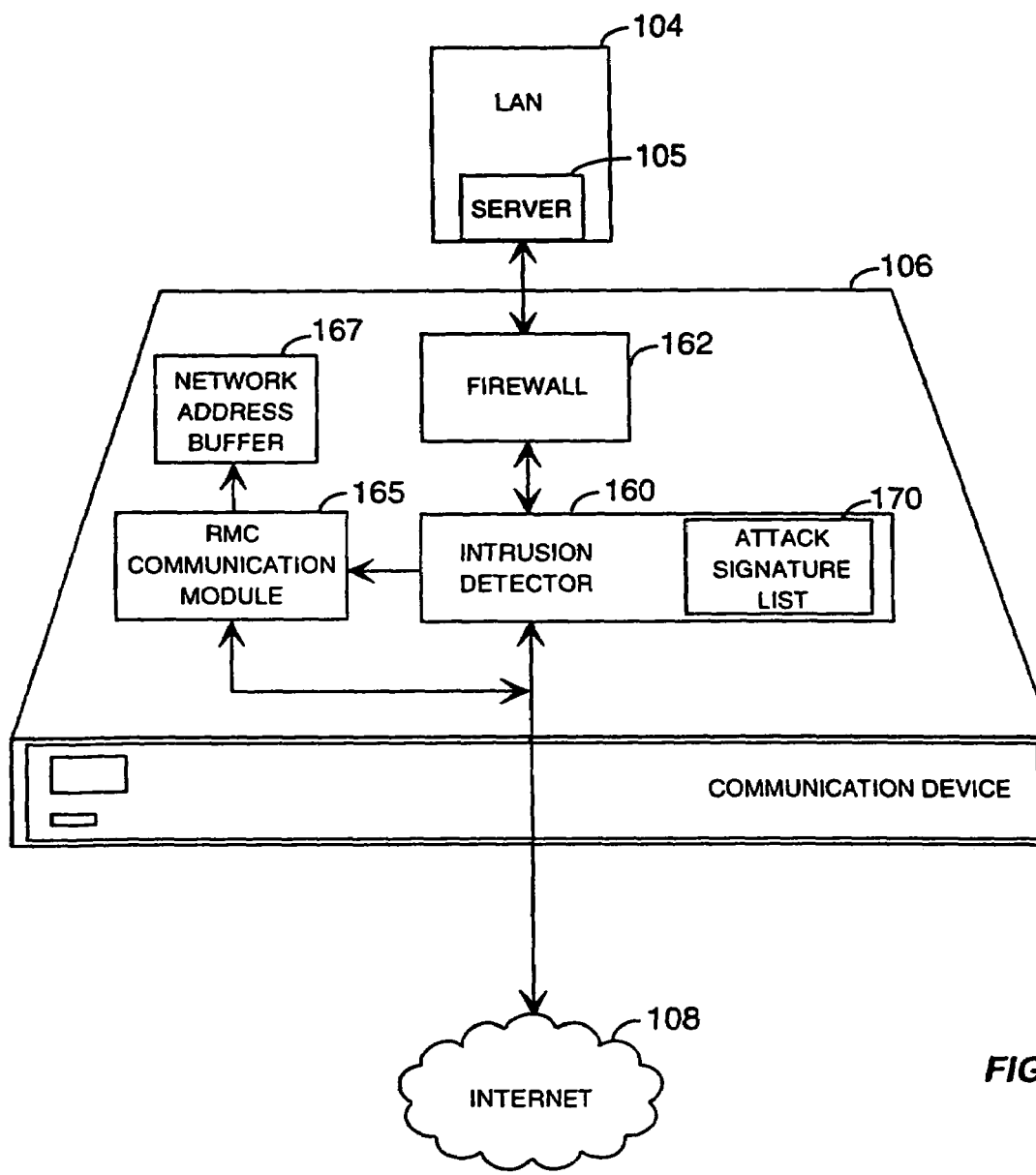
FIG. 2 is a block diagram of a communication device for implementing aspects of the present invention.

Referring now to FIG. 2, aspects of the communication device 106 employed in the present invention will be further described. Communications entering and exiting LAN 104 through communication device 106 proceed via an intrusion detector 160 and a firewall 162. An RMC communication module 165 is operative to receive a signal or message indicative of an attack from the intrusion detector 160 and create a communication to the RMC 130 for handling. A network address buffer 167 stores a network address for the communication device, derived in the manner as described below.

As will be known to those skilled in the art, firewall 162 implements firewall functionality in the known manner by enforcing general entry and exit rules for LAN 104. While firewalls and intrusion detection systems utilize similar technology, firewalls are not typically designed to merely look for intrusions. The main purpose of a firewall is to keep undesired traffic off the network. Accordingly, in the disclosed embodiment the firewall 162 may be of a conventional type, used in the known manner, for shielding the LAN 104 from communications traffic determined by the firewall to be excluded.

In addition to firewall functionality, the preferred communication device 106 implements intrusion detection functionality via intrusion detector 160, by monitoring the communications received into communication device 106 and determining whether such communications comprise an attack or other security risk. More particularly, intrusion detector 160 inspects the unfiltered communications traveling over a specific network segment for the presence of predetermined attack signatures, by comparing to a list 170 of known attack signatures. Attack signatures are activity patterns indicative of undesirable activity, i.e., evidence that an unauthorized communication has been received. Examples of attacks include Denial of Service (DoS) attacks, unauthorized access attacks, attempts to modify data or kill programs, protocol violations, and repeated access attempts indicating malicious intent. Representative examples of attack signatures are shown in FIG. 9 and will be further described below with reference to that figure. Intrusion detector 160 may also monitor for attacks by users that are authorized to be on LAN 104. Therefore, any attack or unauthorized activity on the network can be detected and the RMC 130 is automatically notified by an alert signal transmitted by the RMC communications module 165.

The function of intrusion detection is well known to those skilled in the art. Typically, an intrusion detection function is carried out in software, and can be implemented in software, hardwire, or firmware. Typically, intrusion detection is carried out by comparing an incoming communication (usually comprising a string of characters embedded within a TCP/IP packet, such characters being provided by another computer or a user of another computer that is requesting services) to a list of known attack signatures stored in an attack signature list 170. The attack signature list is preferably stored in a rewritable memory within the communication device 106 so that the list can be updated as new attack signatures are identified.

By way of example, the intrusion detector 160 may comprise an intrusion detection software application, such as SNORT, which is publicly available under the GNU General Public License GNU89. This network intrusion detection software can perform content searching/matching to entries in an attack signature list 170 in addition to being used to detect a variety of other known attacks and probes, such as buffer overflows, stealth port scans, CGI attacks, and SMB probes. Details for the construction and manner of use of SNORT are available from the author, Martin Roesch at roesch@clark.net or from the WWW site, http://www.clark.net/~roesch/security.html.

As hackers develop new attacks, the skilled artisan must develop additional attack signatures identifying these new attacks and store information about these attacks so that intrusion detectors can update their associated attack signature list 170. Those skilled in the art will understand that attack signatures may be obtained from archived and publicly available lists collected by a worldwide community, such as the SNORT signatures. Once an attack and its corresponding attack signature have been identified, they are stored internally of the communication device for use by intrusion detectors in a collection or database of attack signatures. An intrusion detector then is operative to utilize the stored collection of attack signatures to monitor computer communications to determine if any of those communications match one of the prestored signatures. Upon detecting an attack, the intrusion detector may then transmit an alert signal via the RMC communication module 165 to indicate an intrusion has taken place or take other appropriate action. An illustrative method for determining attacks and transmitting alert signals is described below with reference to FIG. 10.

The RMC communication module 165 is further operative to control the loading of updates to the operations of the firewall 162, intrusion detector 160, and attack signature list 170, by receiving queued software updates, patches, and other communications from the RMC controller 112 (FIG. 1).

Figure 3:
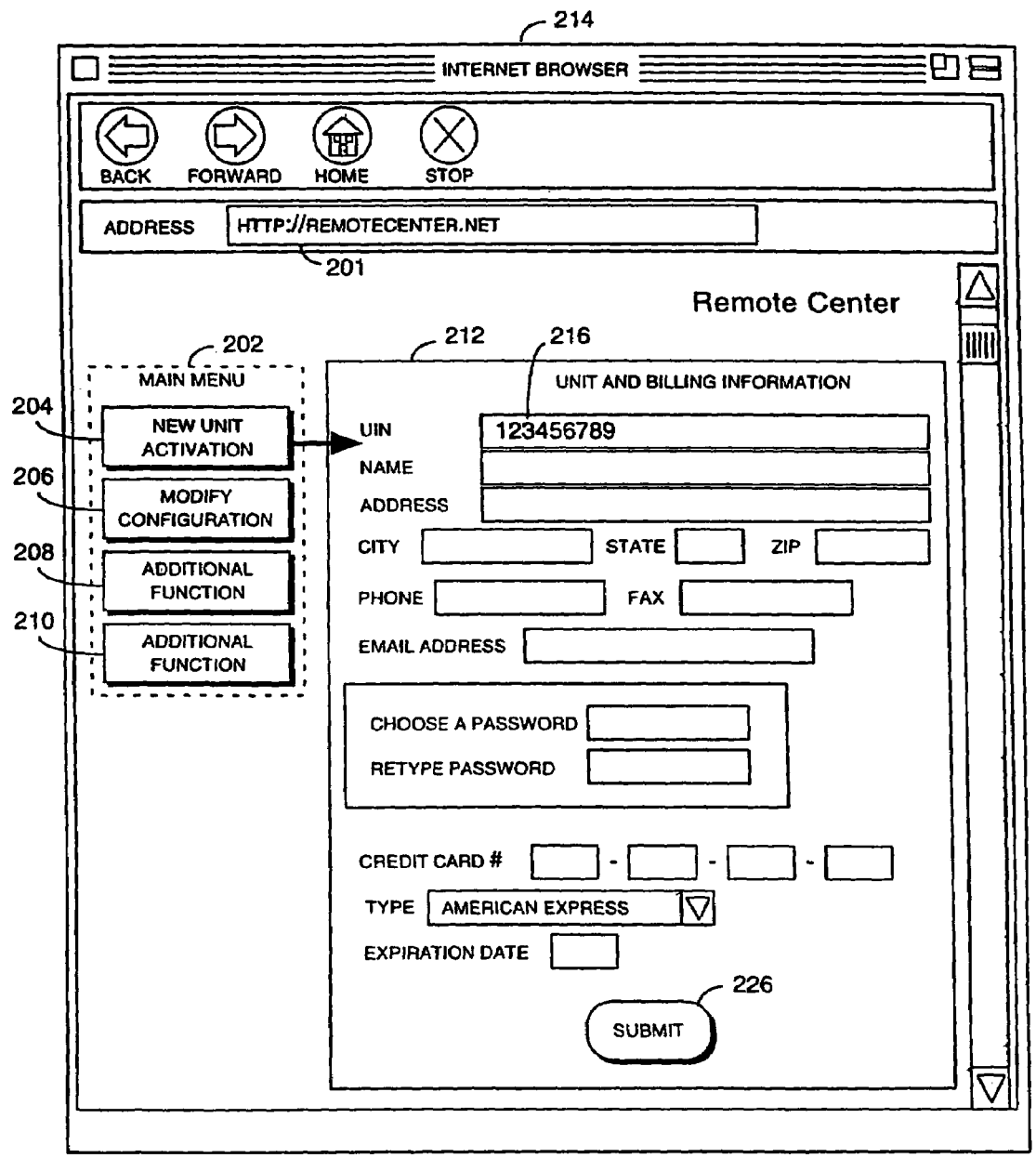
FIG. 3 is a diagram showing a WWW page for remotely configuring a communication device.

Referring now to FIG. 3, a communication device 106 constructed in accordance with the present invention can be configured remotely for operation. FIG. 3 illustrates a screen shot of a user interface 214 of a server-based configuration application program utilized for configuration of users' communication devices, as it would appear on a typical user's computer display screen. In the exemplary embodiment of the invention, the server-based configuration application program is hosted by the front end server 110 (FIG. 1), which stores and retrieves information in the databases 132 for communication device configuration. Details of the server-based configuration application are described in connection with FIG. 6. A user with a communication device to be configured accesses the front end server 110 via a standard Internet browser computer application programs such as Microsoft Corporation's INTERNET EXPLORER™ or Netscape Corporation's NAVIGATOR™ programs.

The user interface 214 is used to access and input information, such as identification and billing information, to and from the server-based configuration application, which can be accessed via the Internet at a particular URL. In the example of FIG. 3, the URL (Uniform Resource Locator, the standard manner for indicating a computer's address on the World Wide Web) of the configuration application is http://REMOTECENTER.NET, which appears in the browser address field 201. The site associated with the URL http://REMOTECENTER.NET in the described example is located and administered by the front end server 110, and provides functionality for receiving and displaying configuration and activation information. The user's browser application program provides functionality for receiving and displaying HTML documents in the manner known to those skilled in the art, and the user interface 214 provides interface features for navigating to and between WWW sites and WWW pages, and for providing information to and retrieving information from server-based programs that operate at such WWW sites. The functionality and operation of WWW sites, WWW browser applications, and user interfaces are well known to those skilled in the art.

In the presently described example, a user of communication device 106 visits the REMOTECENTER.NET WWW site and selects a new unit activation button 204 from a main menu 202 to request a new unit activation WWW page from the front end 110. The front end 110 receives that request and transmits a new unit activation screen or region 212, containing empty unit and billing information fields, to the browser application. The new unit activation screen or region 212 is then displayed to the user via the user interface 214, with a number of fields for receiving the user's inputted information. The user will then be prompted to type in these fields information required for activating a new communication device, for example a unique identification number (UIN) 216 corresponding to the user's communication device 106, the user's billing information: including name, address, telephone number, credit card number, e-mail address, selected password, etc.

After filling in the fields in the new unit activation region 212, the user then submits that information by clicking a submit button 226. The user's browser then transmits the information to the front end server 110 for use by the server-based configuration application program.

Upon submission of the UIN and billing information, the UIN is then verified against a comprehensive list of UINs by the server-based configuration application. This comprehensive list may comprise the UINs previously transmitted (via wake-up signals) from communication devices known to have been sold. If the UIN received at the REMOTECENTER.NET WWW site does not match a UIN in that comprehensive list, the server-based configuration application may transmit an error message to the user, such as "UIN invalid, please reenter UIN." If a match is found, however, the UIN and billing information is then stored in an inactive database 120, as is further described with reference to FIG. 5 below.

Still referring to FIG. 3, after the UIN is verified and the UIN and user billing information is stored in the inactive database 120, the user may then select alternate user interface buttons 206, 208, or 210 in the main menu 202 to obtain additional functionality. As described in more detail below with reference to FIG. 4, a modify configuration button 206 may be utilized to change the security policy of the protected network, for example LAN 104. "Additional function" user interface buttons 208 and 210 may be selected to gain access to additional features of the REMOTECENTER.NET WWW site, as may be established by the operator of the remote monitoring center.

Figure 4A:
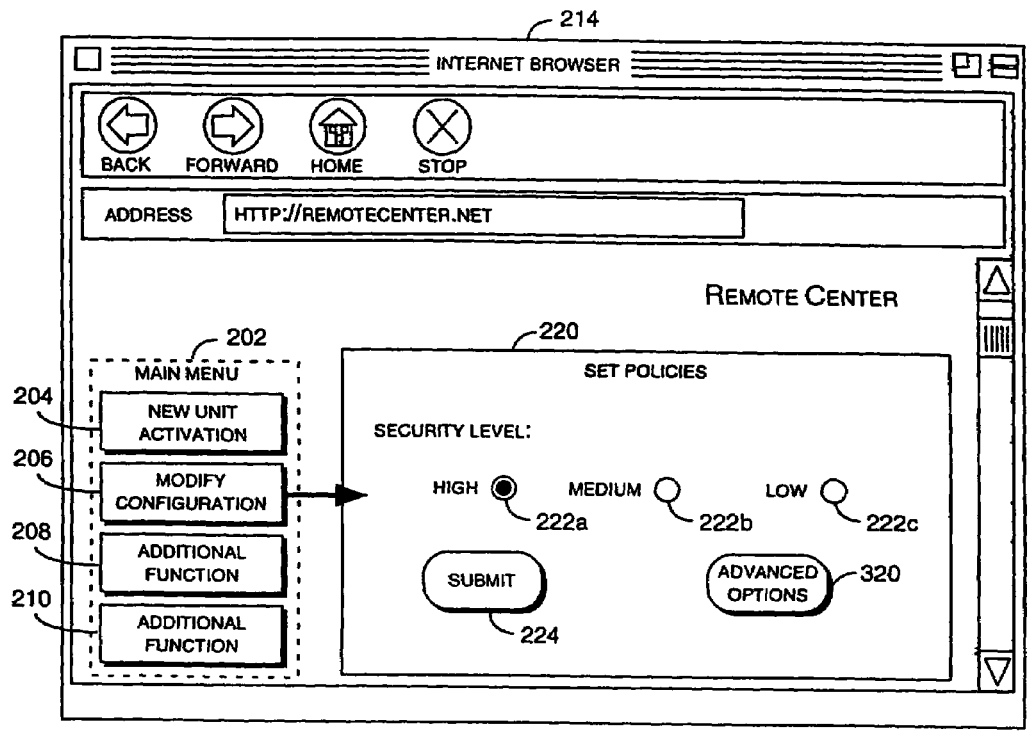
FIG. 4, consisting of FIGS. 4A and 4B, illustrates WWW pages for configuring security options for a communication device.
Figure 4B:
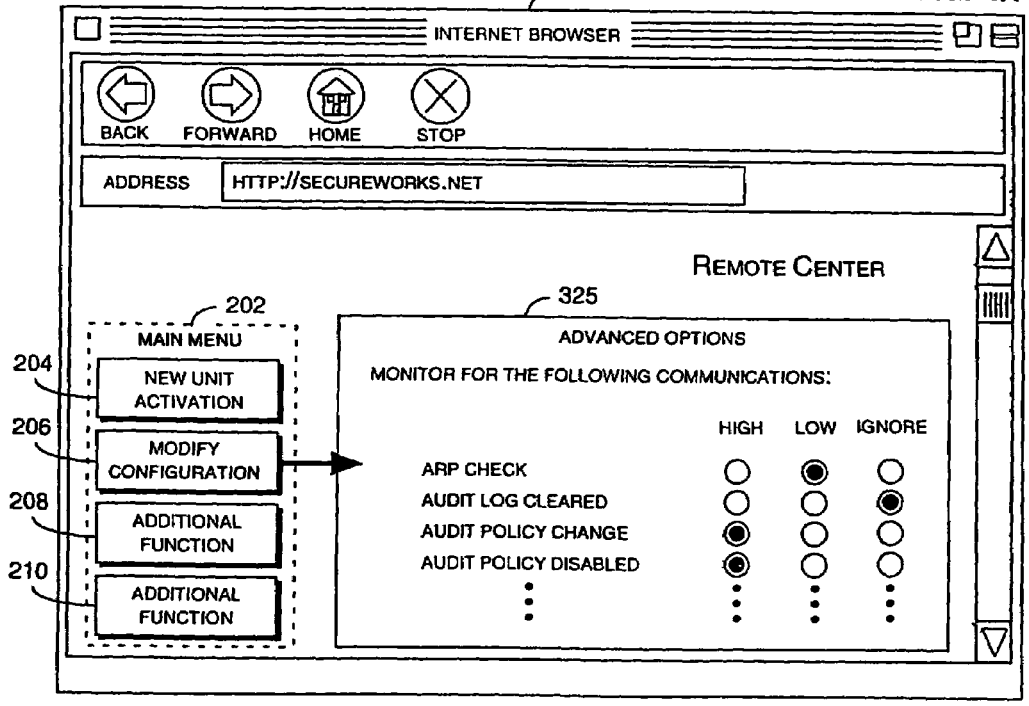

Refer now to FIG. 4 for a discussion of the manner employed in the disclosed embodiment of the invention for setting a user's communication device security policy and advanced options for monitoring the device. FIG. 4, consisting of FIGS. 4A and 4B, are illustrative screen shots of user interface 214 displaying user-selectable configuration options for selecting a security policy for the communication device 106 and LAN 104. A security policy may be defined as the set of decisions that, collectively, determines an organization's or user's posture toward their computer network security. More precisely, a security policy determines the limits of acceptable behavior within the operation of a network and the response to violations.

In FIG. 4A, a "set policies" information display area 220 is shown in the user interface 214, which is displayed in response to the user selecting the modify configuration button 206 of the main menu 202. In an illustrative embodiment of the present invention, the set policies information display area 220 includes three user-selectable radio buttons 222a, 222b, 222c representing three distinct levels of computer network security (i.e., three distinct security policies), respectively, high, medium, and low. A predetermined level of network security, that is, monitoring for certain predetermined threats and providing certain predetermined responses to such threats, may be established by the user.

The user may easily configure the security policy for communication device 106 by selecting one of the radio buttons, and then clicking the submit button 224. As will be described in more detail below with reference to FIG. 11, the user-selected security level is utilized to configure the firewall and intrusion detection features of communication device 106 in accordance with the user's preferences, to carry out predetermined responses to certain predetermined threats. Such configuration options offer the user a simple means of selecting a complex and comprehensive security policy without extensive knowledge or training on the part of the user. The RMC is operative in response to the selection of one of the selectable security levels to automatically configure the communication device to monitor for certain predetermined threats and to provide certain predetermined responses thereto. For example, a high security level may be a policy that monitors for any type of file transfer protocol (ftp) communication received from any source, and responds to such ftp communication by terminating the communication. On the other hand, a medium security level may be a policy that monitors for ftp communications, disallows certain ftp commands but allows others. Continuing the example, a low security level may be a policy that allows almost all ftp commands except certain high risk ones such as a root login.

If the user desires more specific configuration options, the user may alternatively select an advanced options button 320 to display itemized configuration options. FIG. 4B illustrates an advanced options information display area 325 that is displayed in response to selection of the advanced options button 320. The advanced options information display area 325 includes advanced user-selectable configuration, monitoring, and response options for the user's communication device. According to an illustrative embodiment of the present invention, the advanced options may comprise a list of known attacks, such as an ARP (address resolution protocol) check, clearing of the audit log, change of audit policy, disabling of audit policy, login attempts to disabled or expired accounts, etc. The information display area 325 contains several exemplary types of communications that can be selected for monitoring; other types of communications that can be monitored will be known to those skilled in the art.

Preferably, the advanced options information display area 325 provides a selectable option or intrusion rule for each listed attack so that the user may configure the communication device 106 to monitor selected types of communications and to establish a security level or policy for each. In addition, the user may preferably choose individualized responses to each detected intrusion. For example, as shown in FIG. 4B the user may categorize each selected attack as either a high priority, low priority, or ignore event. In accordance with the invention, each distinct priority triggers a different level of response in the communications device 106. For example, the user may select to terminate all high priority events but merely record or log the low priority events. In this manner, a sophisticated user may customize the security options of communication device 106 not only by selecting the communications which need to be monitored, but also determining the level of response to each attack.

Figure 5:
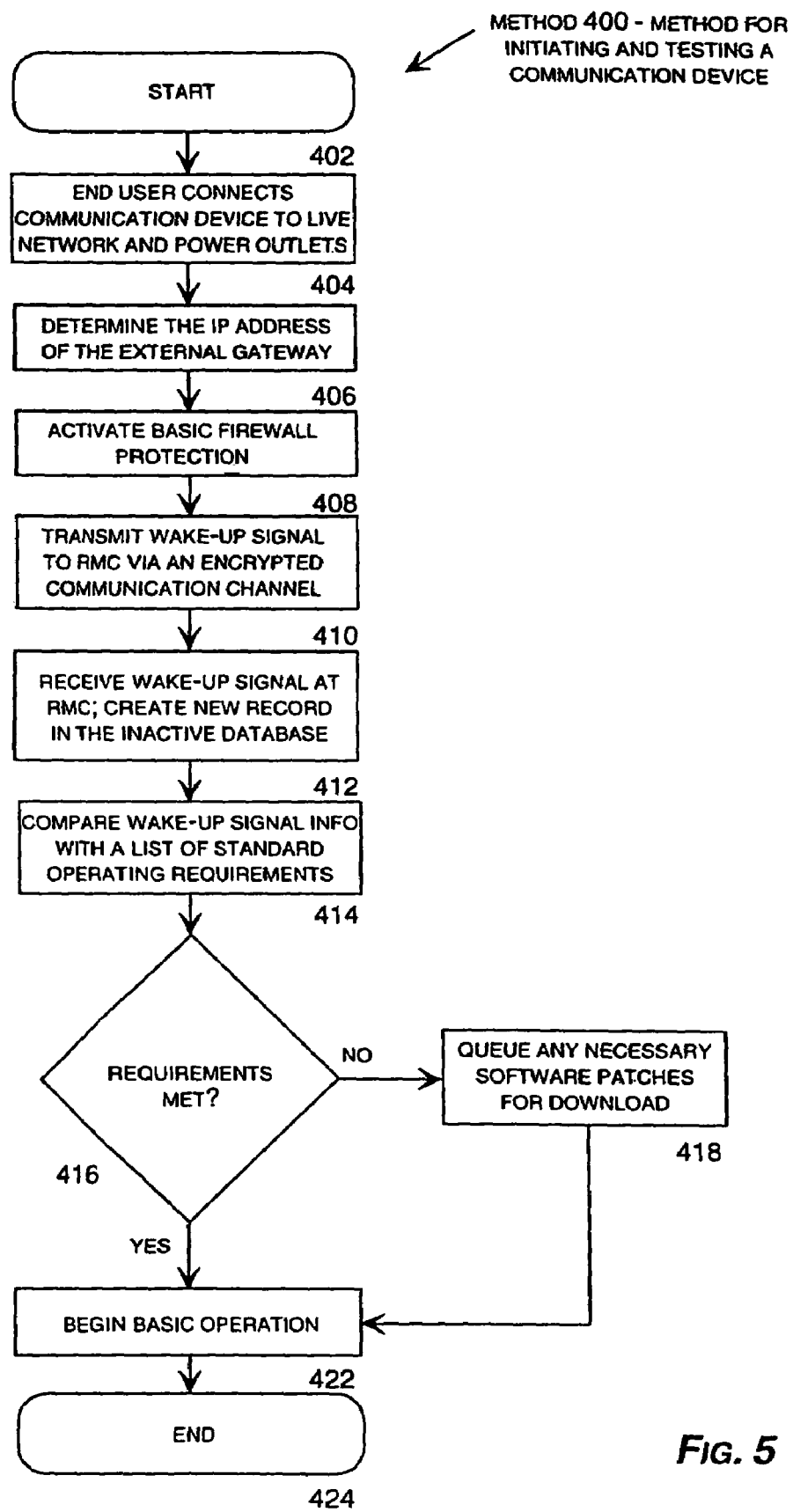
FIG. 5 is a flow diagram showing an illustrative method for initiating a remotely configurable and monitorable communication device.

Referring now to FIG. 5, an illustrative method 400 for initiating and testing a communication device will be described. The described method or process is preferably implemented as combination of steps carried out by a user when a new communication device 106 is to be installed and configured, in conjunction with computer program steps carried out by the communication device 106 and computer systems associated with the remote monitoring center 130 in response to communications received from a new communication device upon its installation and activation.

Method 400 begins at step 404, where the user installs communication device 106 by connecting it to both a live network and a power connection. Step 404 proceeds to step 406, where the communication device 106 determines the IP (Internet Protocol) address of any associated gateway associated with the user's LAN, for example the gateway server 105 in FIG. 1. As known to those skilled in the art, an IP address comprises a predetermined number in the form of NNN.NNN.NNN.NNN, where N is a decimal number, which identifies the sender or receiver of each packet of information that is sent across a TCP/IP network. The obtained IP address is stored in the network address buffer 167 (FIG. 2) for use in network operations, e.g. when identifying itself to the remote monitoring center with the wake-up signal.

In an embodiment of the invention, communication device 106 may obtain the IP address of the gateway by performing a DHCP (Dynamic Host Configuration Protocol) or BOOTP (Bootstrap Protocol) procedure. Either protocol may be used to automatically obtain an IP address without network user involvement. While DHCP is a more advanced protocol than BOOTP, both configuration management protocols are commonly used and well known to those skilled in the art. In this manner, the communication device 106 can determine its own network address.

Method 400 continues from step 406 to step 408, where communication device 106 activates its basic firewall and intrusion detection policies to start protecting the network to which it is connected. The method continues from step 408 to step 410, where the communication device 106 transmits a wake-up signal to the RMC 130 via an encrypted communications channel. An encrypted data channel may use any form of encryption, such as block cipher encryption, which is well know to those skilled in the art. According to an embodiment of the invention, the wake-up signal comprises the IP address, a MAC (Media Access Control) address (i.e., a hardware device level address), the UIN, and a software release version number associated with the communication device 106. In addition, the wake-up signal may also comprise diagnostic variables associated with the operations of the communication device 106, such as power source voltage, internal temperature of communication device, or other parameter indicative of the state of operations of the communication devices.

From step 410, the method 400 continues to step 412, where RMC 130 receives the wake-up signal and records the information contained in the signal in the inactive database 120. From step 412, the method continues to step 414, where RMC 130 compares the information contained in the wake-up signal with a list of required standard operating requirements. For example, in an embodiment of the invention, RMC 130 reviews the software version and the diagnostic variables received as part of the wake-up signal to determine whether communication device 106 is operating correctly. In other words, RMC 130 may utilize that information to determine whether the device 106 is carrying the latest software version or operating within the correct voltage and temperature ranges.

Still referring to FIG. 5, from step 414, the method 400 continues to decision block 416, where a determination is made as to whether the operational requirements have been met. If communication device 106 satisfies the operational requirements, the method continues to step 422, where basic operation of communication device 106 begins. In an embodiment of the present invention, basic operation may comprise activating full firewall intrusion detection functionality of communication device 106 only without the functionality of remote monitoring via RMC 130. If, however, communication device 106 fails to meet the operational requirements, then method 400 branches to step 418.

At step 418, RMC controller 112 queues any necessary software patches, for example an update to the attack signature list 170 (FIG. 2, FIG. 9) for download to communication device 106. As will be described in more detail below with reference to FIG. 6, these software patches or updates will be transmitted to the communication device 106 upon the user's selection of the new unit activation button 204 (FIG. 3) while connected to the REMOTECENTER.NET WWW site. Method 400 continues from step 418 to step 422, where, as described above, communication device 106 initiates basic unmonitored operation. Method 400 then proceeds to step 424, where it ends.

Figure 6:
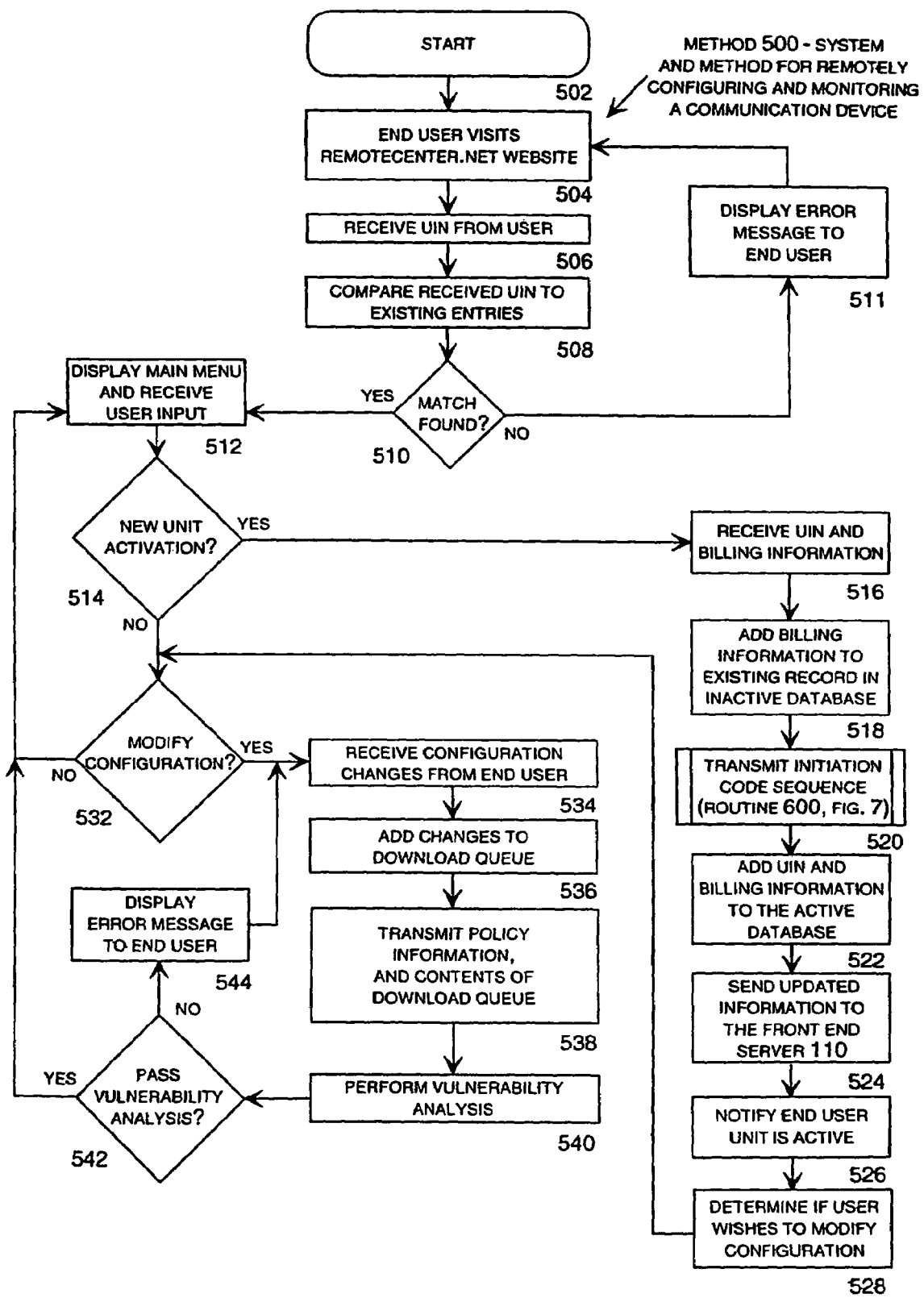
FIG. 6 is a flow diagram showing an illustrative method for remotely configuring and monitoring a communication device.

Referring now to FIG. 6, an exemplary method 500 for remotely configuring and monitoring a communication device is described. The method 500 is carried out in the present invention as a combination of steps taken by a user accessing the REMOTECENTER.NET WWW site and computers associated with the RMC 130. In particular, the front end server 110 provides the necessary user interface 214 for receiving user input (e.g. FIG. 3), and the RMC controller 112 receives the inputted information from the front end server 110, utilizes that information in the configuration operations, and stores appropriate information in the databases 132.

Method 500 begins at step 504, where the user accesses the REMOTECENTER.NET WWW site and enters the UIN of communication device 106 via a user interface 214 such as described in connection with FIG. 3. The UIN may be provided as a label or printing on the communication device 106 or within documentation provided with the device 106. Method 500 continues from step 504 to step 506 where the RMC controller 112 receives the entered UIN via the front end 110. Method 500 then continues to step 508 where RMC controller 112 verifies the entered UIN by comparing the UIN with a list of valid identification numbers, such as a list of identification numbers previously received from communication devices. This list of previously received UINs is preferably compiled by receiving and saving UINs transmitted from communication devices to the RMC 130 upon power-up (i.e., UINs received from wake-up signals), and storing the list in the inactive database 120, as described in connection with FIG. 4.

Method 500 continues from step 508 to decision block 510, where a determination is made by the RMC controller 112 whether a UIN provided by the user matches a previously received UIN as stored in the inactive database 120. If the entered UIN cannot be matched to a valid identification number, method 500 branches to step 511, where an error message is generated, transmitted to the front end server 110, and displayed to the user via the user interface 214 to inform the user that the entered UIN is not valid. Method 500 then returns to step 504, where the front end 110 waits for the user to reenter a valid UIN.

If at decision block 510 it is determined that the UIN matches a previously received UIN, method 500 continues to step 512, where the front end 110 displays main menu 202 via the user interface 214 and awaits user input. As previously described in connection with FIG. 3, the menu 202 preferably comprises options for configuring a new communication device, such as represented by the new unit activation button 204, or modifying the configuration of a previously configured device, such as represented by the modify configuration button 206.

In response to the selection of a main menu 202 option, method 500 proceeds from step 512 to decision block 514, where a determination is made as to whether the user has selected the new unit activation button 204. If at step 512, a determination is made that the user has not selected the new unit activation button 204, method 500 branches to decision block 532. If, however, the user has selected the new unit activation button 204, then method 500 continues to step 516.

At step 516, the user is prompted to provide user billing information, such as name, address, telephone number, credit card number, etc. This billing information is used to charge the user of communication device 106 for the monitoring services described herein. Method 500 then continues from step 516 to step 518, where RMC controller 112 records and associates this billing information to the existing UIN, corresponding to communication device 106, that is contained in the inactive database 120, as described with reference to FIG. 5 above. Method 500 then continues from step 518 to step 520, where RMC controller 112 transmits any software patches contained in a download queue as well as any necessary activation codes to the communication device 106 by way of the RMC communication module 165, which is further described below with reference to FIG. 7.

Still referring to FIG. 6, from step 520, method 500 continues to step 522, where RMC controller 112 moves the recorded information associated with communication device 106 from the inactive database 120 to an active database 118. This informs monitoring engine 114 to begin monitoring communication device 106 for incoming alert signals. An illustrative method for remotely monitoring communication device 106 is described below with reference to FIG. 8.

Method 500 continues from step 522 to step 524, where RMC controller 112 transmits the recorded information to the front end server 110 for communication to the user. As will be understood, the configuration information for communication device 106 is stored in the databases 132, and in particular the active database 118 and the inactive database 120, which can be accessed by a user via the REMOTECENTER.NET WWW site in response to entry of appropriate security information such as a user name and password. Therefore, if configuration information for communication device 106 is lost, the configuration information can easily be retrieved through the REMOTECENTER.NET WWW site.

Method 500 continues from step 524 to step 526 where the user is notified via the browser user interface 214 that the communication device 106 is active and fully monitored based upon a set of standard security options. Method 500 then proceeds to step 528.

At step 528, RMC controller 112 collects user input via front end 110 as to whether the user wishes to modify the configuration of communication device 106 from the standard security options. In accordance with an embodiment of the present invention, configuration changes may comprise changing intrusion rules, monitoring policies, response policies, and user access policies concerning unsuitable or inappropriate communications received at communication device 106. Method 500 then continues from step 528 to decision block 532.

At decision block 523, reached either from step 514 or step 528, a determination is made as to whether the user selected the modify configuration button 206 (FIG. 3). If it is determined that the user has not requested to modify the configuration, method 500 returns to step 512. If, however, the user has selected to modify the configuration, then method 500 continues to step 534, where the user is prompted to select configuration changes. As described above with reference to FIG. 4, configuration changes may comprise selecting a certain level of security or identifying specific attacks that should be identified as security risks. After RMC controller 112 receives any entered configuration changes via the front end 110, method 500 continues to step 536, where the entered configuration changes are added to a download queue. Method 500 then proceeds from step 536 to step 538.

Still referring to FIG. 6, at step 538 the configuration changes are transmitted via an encrypted channel and applied to communication device 106. Method 500 then continues to step 540, where the monitoring engine 114 performs a vulnerability analysis on communication device 106. In accordance with an embodiment of the present invention, the vulnerability analysis is conducted by communications from the monitoring engine 114 to the particular communications device 106 via the Internet 108, and preferably comprises checking the security options to determine whether the user has deselected important intrusion rules and searching for any open ports on communication device 106. The reader will appreciate that additional types of security checks may be performed on communication device 106, such as checking password security, encryption security, and the like.

From step 540, method 500 proceeds to decision block 542 where a determination is made whether communication device 106 has passed the vulnerability analysis. If communication device 106 passes the vulnerability analysis, method 500 returns to step 512. If, however, communication device 106 fails the vulnerability analysis, then method 500 branches to step 544, where an error message is displayed to the user and the user is prompted to modify the configuration of communication device 106. From step 544 method 500 returns to step 534, where RMC 130 receives for new configuration changes.

Figure 7:
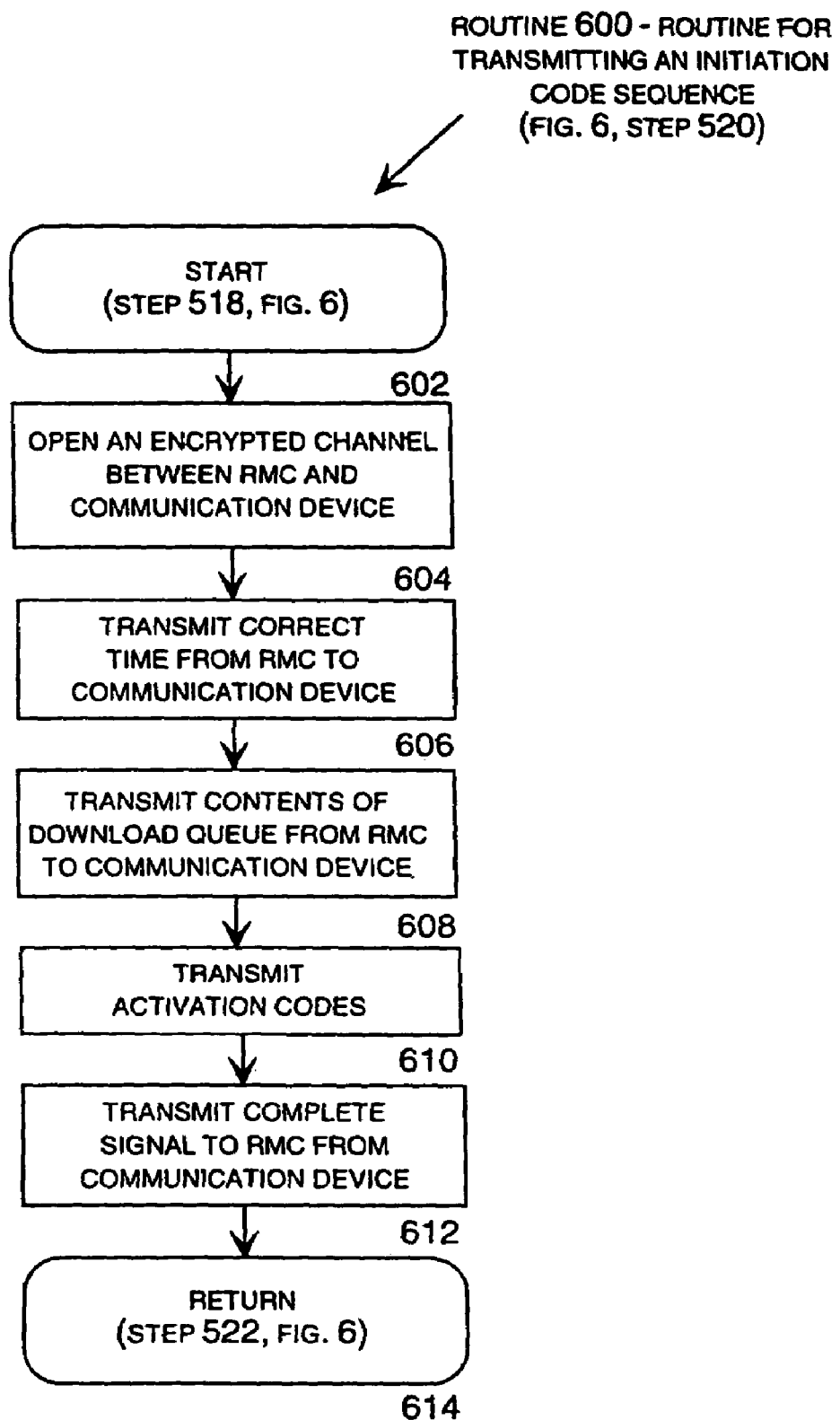
FIG. 7 is a flow diagram showing an illustrative method for transmitting an initiation code sequence from a communication device to a remote computer.

Referring now to FIG. 7, a routine 600 for transmitting an initiation code sequence to a communication device 106 will be described. Routine 600 begins at step 604 where an encrypted communication channel is opened between the RMC communication module 165 of a the communication device 106 and RMC controller 112. The operation of encrypted communications is well known to those skilled in the art and will not be described further herein. From step 604, routine 600 proceeds to step 606, where, according to an embodiment of the invention, the correct time is transmitted to communication device 106. Routine 600 then continues to step 608.

At step 608, any necessary software updates are transmitted from the RMC controller 112 to the communication device 106 via the RMC communication module 165. As described above with reference to FIG. 5, the current software release version of communication device 106 is transmitted to RMC controller 112 via the wake-up signal. This release version is examined by RMC controller 112 to determine if software updates or patches are necessary. If such patches are necessary those patches are obtained from a download database 122 (FIG. 1) and placed in a download queue. In particular, if any updates to the attack signature list 170 have been created at the RMC, an updated attack signature list can be download into the communication device ro use in detecting new types of attacks.

At step 608, the contents of the download queue are transmitted to communication device 106 via the encrypted communications channel. Communication device 106 applies any transmitted software patches to its internal firmware, and routine 600 continues from step 608 to step 610. The reader should appreciate that multiple software versions may be maintained on communication device 106 in case the newest software version is corrupt or improperly installed. For example, in an embodiment of the present invention, two versions are maintained on the device 106, wherein the older of the two versions is replaced by the newest update. Thus, the two newest versions of software will always be available.

Still referring to FIG. 7, at step 610 RMC controller 112 transmits activation codes necessary to initiate transmission of alert signals from communication device 106 to monitoring engine 114. After transmission of the activation codes, routine 600 proceeds to step 610, where communication device 106 transmits a complete signal via its RMC communication module 165 to RMC controller 112 to inform RMC controller 112 that the initiation code sequence has been correctly received and communication device 106 is active. Routine 600 then returns to step 522 (FIG. 6).

Now referring to FIG. 8, a method 700 for remotely monitoring the operation of communication device 106 will be described. The method 700 in the disclosed exemplary embodiment is preferably carried out as a series of computer program steps taken within the communication device 106, communications to the RMC 130, and responses taken within the RMC. It will be understood that the method contemplates a communication device 106 that has been previously activated and configured in accordance with processes described earlier herein, and is on a list of active communication devices remotely monitored by the RMC 130.

Method 700 begins at step 702, where an activated and remotely monitored communication device 106 receives a communication, for example from a hacker 150 (FIG. 1). This communication may constitute a threat or attack to the user's network, or may merely constitute a desired communication. Method 700 continues to step 704, where the received communication is compared to a list of known attacks and the result of the comparison is provided to a decision block 706. Preferably, all received communications are analyzed and compared to the list of known attacks. As described above with reference to FIG. 4B, a received communication will generally constitute a security risk if the type of communication received matches a communication type on the predetermined list 170 of communication types deemed to be attacks.

If at decision 706 the received communication matches one of the known types of attacks on the list maintained at the communication device, a "threat event" is deemed to have occurred. The method then branches to step 707. If at decision 706 the received communication does not match one of the known types of attacks on the list maintained at the communication device, the communication is not deemed threatening and control passes to step 712, where the communication is routed to its destination.

At decision block 707, a determination is made as to the priority of the threat event. In particular, the determination is made first whether the threat event further comprises a low priority event. Based upon security options selected by the user, a low priority event comprises a security risk that is deemed not to present a serious threat and therefore does not necessarily require immediate response on the part of the RMC. If the threat event is determined to comprise a low priority event, method 700 continues to step 708, where a low priority response action is taken. In the disclosed embodiment, a low priority response action entails the transmission of an alert signal to RMC 130 for evaluation. Those skilled in the art will understand that other types of actions may be taken in response to a low priority event, as determined by and at the discretion of the system operator.

If at decision block 707 it is determined that the threat event does not comprise a low priority event, method 700 branches to decision block 710, where a further determination is made whether the threat event comprises a high priority event. According to an embodiment of the present invention, a high priority event may comprise a serious threat such as a DoS attack. The goal of a DoS attack is not to steal information, but to disable a device or network so users no longer have access to network resources. For example, "WinNuke," a widely available DoS tool, may be used to remotely crash any unprotected computer running Microsoft Corporation's Windows operating systems. In accordance with the invention, the communication device 106 may be configured to protect LAN 104 from WinNuke and other DoS attacks by providing information indicative of DoS attacks in the list of security risks.

If a determination is made that the threat event does not comprise a high priority event, the remaining or default state is that the user has selected the "ignore" button (FIG. 4B) for the communication, notwithstanding that the event is on the list of known security risks, and the method 700 branches to step 712 where the communication is routed to its intended destination.

After step 712, where the communication is routed to its intended destination, the method 700 then returns to step 702, where the communication device 106 continues to receive and analyze communications.

Figure 8:
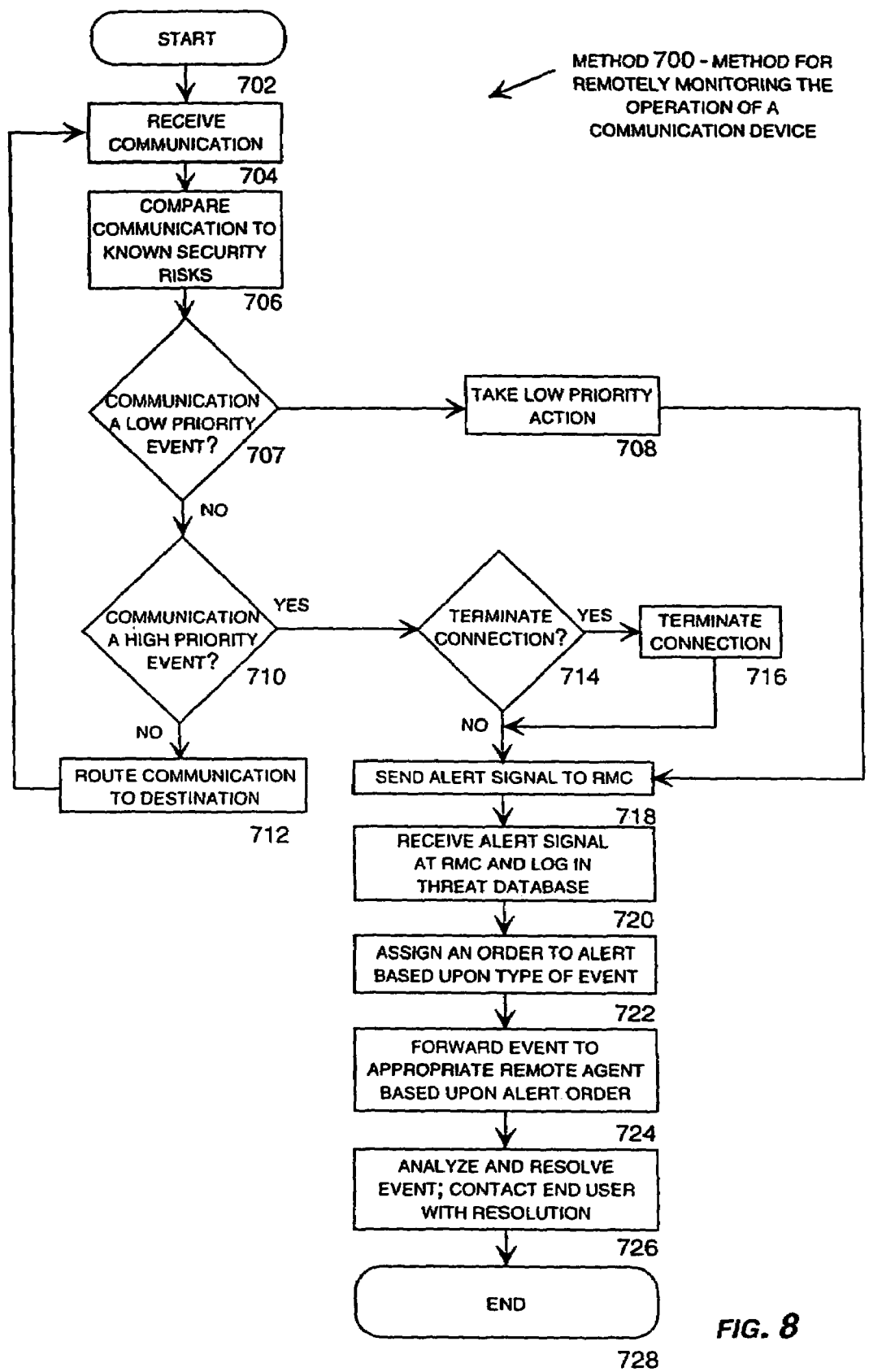
FIG. 8 is a flow diagram showing an illustrative method for remotely monitoring a communication device.

Still referring to FIG. 8, if at decision block 710 the communication is determined to constitute a high priority threat event, and therefore a high security risk, method 700 continues to step 713, where a high priority event action is taken. In the disclosed embodiment, a high priority event action calls for immediate protective action. Accordingly, the preferred high priority event action includes decision block 714 where a determination is made as to whether the communication comprises such an immediate threat to LAN 104 that it should be immediately terminated. In that case, method 700 branches to step 716, where communication device 106 terminates the received communication, for example by discarding the TCP/IP packet. Method 700 then proceeds to step 718.

Those skilled in the art will understand that other responses to a high priority threat event may also be taken, not merely termination of the connection, for example, by providing a visible threat indicator to the user by generating an error message on a computer associated with the user's LAN 104, for example computer 102 (FIG. 1), by locally logging communications received from the source of the communication, or by isolating one or more threatened computers from the remainder of the network, etc. Other appropriate responses will occur to those skilled in the art.

If at step 714 a determination is made that the communication should not be terminated, method 700 continues to step 718 without terminating the communication. In an embodiment of the present invention, high priority events includes various types of DoS attacks and will always be terminated. The reader should appreciate, however, that the user may categorize additional non-DoS attacks as high priority events, which the user may not necessarily consider serious enough to cause immediate termination.

In an embodiment of the present invention, all communications (even if they do not comprise a high or low priority event) may be transmitted and recorded at RMC 130 for subsequent analysis. Furthermore, in the described embodiment both high priority and low priority events cause the transmission of an alert signal to the RMS 130. Thus, at step 718, which can be reached either from step 708 or 714, communication device 106 transmits an alert signal to monitoring engine 114. An illustrative method for determining attacks and transmitting alert signals is further described below with reference to FIG. 10.

Method 700 continues from step 718 to step 720, where monitoring engine 114 receives and records the alert signal in a threat database 124. Method 700 then continues to step 720 where monitoring engine 114 assigns an order preference to the attack based upon the type of received communication and predefined user response policies. From step 720, method 700 proceeds to step 724, where monitoring engine 114 forwards the communication to one of the remote agents 126a-126n based upon that assigned order. In an embodiment of the present invention, remote agents 126a-126n may comprise human technicians or software application programs for classifying and handling identified security risks.

Method 700 continues to step 726 where one or more of the remote agents 126a-126n analyze the received communication and provide a resolution, such as terminating the communication (if not already done), modifying the security options of communication device 106, and the like. Additionally, the user may be contacted with an appropriate resolution, such as by transmitting instructions to the communication device to cause disconnection of LAN 104 from outside networks. The user can be contacted in various manners, for example, by e-mail, by beeper, by telephone, by a predetermined communication issued to a particular port on the user's computer system, or by other communication means. Method 700 then ends at step 728. An illustrative method for receiving alerts and resolving attacks is further described below with reference to FIG. 11.

Refer now to FIG. 9 for a discussion of the list 170 of simplified exemplary attack signatures. As described above in connection with FIG. 8, a communication device 106 constructed in accordance with the present invention is operative to store a list 170 of attack signatures, and to compare an incoming communication to entries on the list to determine if a received communication constitutes a threat event and respond accordingly. The list 170 comprises a plurality of entries, preferably arranged in a predetermined sort order to facilitate rapid access by indexing or hashing.

Each exemplary entry on the list 170 comprises a header field 810, a body field 820, and a two-bit priority field 826. The priority field 826 in the disclosed embodiment is 00=ignore, 01=low priority, 10=not assigned (unused), and 11=high priority. Those skilled in the art will understand that the priority field is set in accordance with user and/or predetermined remote monitoring system preferences, for example by establishing certain predetermined priorities for certain types of signatures via a high, medium, or low set policy (FIG. 4A), or by user setting of priority through the advanced options settings (FIG. 4B).

The header 810 may comprise an IP address 812 and a port number 814. The IP address is the destination address of the communication device. Port numbers appear after the IP address and typically indicate a particular type of data communication service, some of which are known to be associated with security attacks, for example, a login host protocol on port 49. As will be known to those skilled in the art, Internet data communication services are provided on a particular port number of a particular server that provides that service, with the port number identifying a type of data communication service. While most Internet data communication services have standard port numbers (e.g., port 21 is for ftp (file transfer protocol) services, port 23 is for telnet services, port 25 is for smtp (e-mail), port 80 is for http (hypertext transfer protocol used for the WWW), etc.), services can also occur on non-standard ports. Those skilled in the art will understand that standard port numbers can be obtained by reference to Internet Request for Comments (RFC) 1700, Assigned Numbers, by J. Reynolds, J. Postel, July 1994.

The reader should appreciate that header 810 may comprise additional elements, such as source and destination IP addresses, source and destination ports, fragmented bits and data transfer protocols, etc., which are well known to those skilled in the art.

Attack signatures may further comprise a body 820 comprising a message field 822 and a content field 824. The message 822 is indicative of the communication's type. For example, an exemplary attack signature 830 for a ROOT login attempt on an FTP server shows a message 833, "FTP-user-root." The content 834 may comprise the actual character string entered by the source of the communication. For example, attack signature 830 contains a string "user root lodl" (where lodl represents a carriage return), which is the exact sequence of characters that would be entered by a person (such as a hacker) attempting to enter an ftp-capable server and issue commands at the "root level" of access. The root level, as will be known to those skilled in the art, is the highest level of access to a computer's services, which essentially means access to all files and services offered by that computer.

As another example, the attack signature 832 indicates an incoming communication intended for port 23 with a message field of "any" and a data field of "any". This means that any communication received on port 23 having "any" information whatsoever in the message or content fields will be treated in accordance with the assigned priority. In the example given, the attack signature 832 is assigned a high priority (11), indicative that any communication on port 23 should be deemed a serious threat and treated accordingly.

It will now be understood that the list or table 170 comprises a collection of information indicative of various types of attacks or threats on computers that might be issued by unauthorized persons or hackers, that this list is maintained within a communication device 106 constructed to be operative in accordance with the present invention, and that the entries on this list are utilized by a communication device as it carries out the step 704 (FIG. 8) of comparing an incoming communication to entries in the list. It will be further appreciated that this list may be changed from time to time by loading in a new or updated list directly from a device connected to the LAN 104 (FIG. 1), by way of a communication received from the RMC controller 112, or by other means. In this manner, communication devices may be kept up to date as new security threats are discovered and documented.

Figure 10:
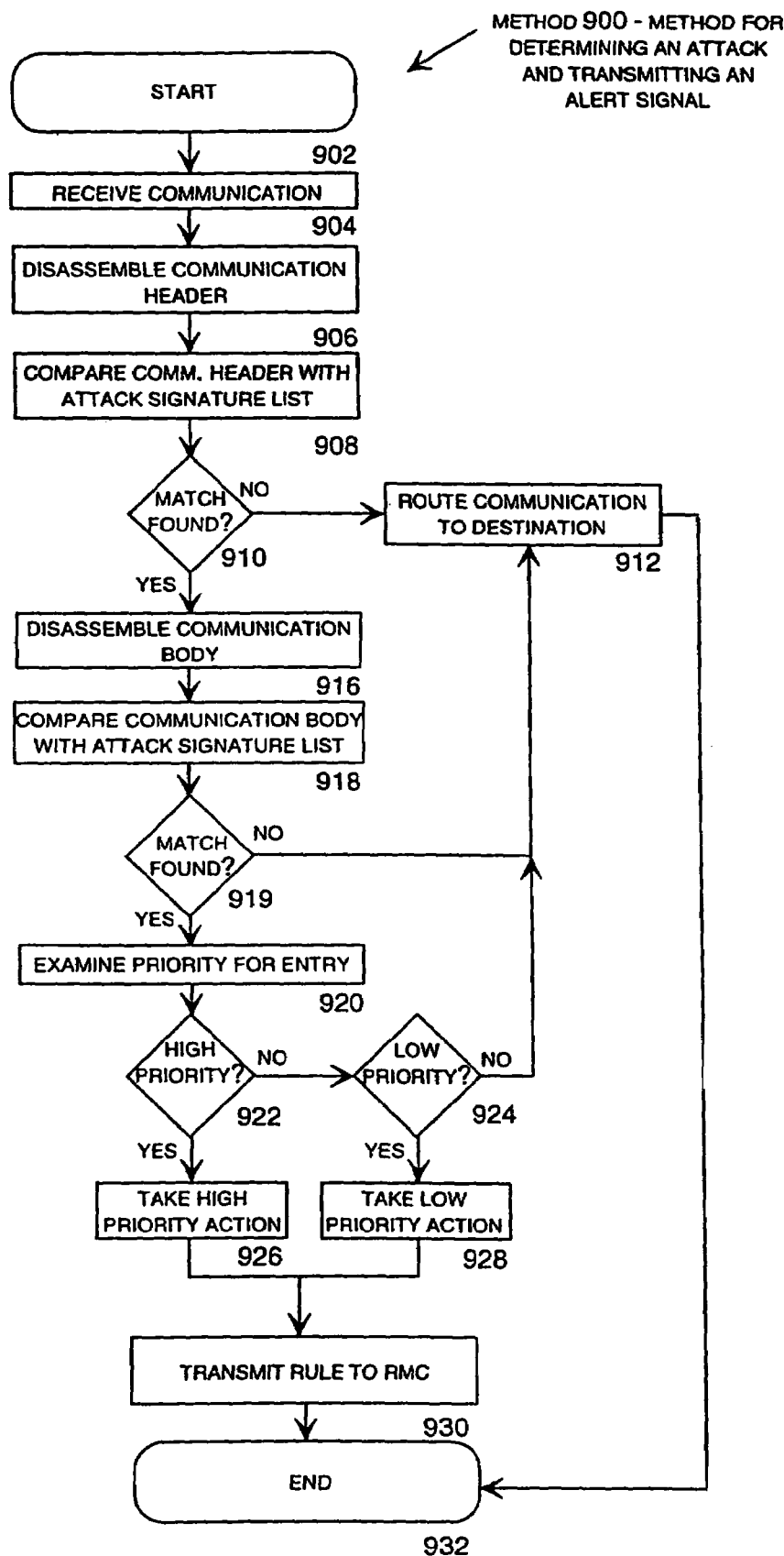
FIG. 10 is a flow diagram showing an illustrative method for determining an attack and transmitting an alert signal.

Referring now to FIG. 10, an illustrative method 900 for detecting attacks and transmitting alert signals will be described. The method 900 is preferably carried out within a communication device 106, by intrusion detector 160 in conjunction with RMC communication module 165.

Method 900 begins at step 902, where the communication device 106 receives a communication that arrives at intrusion detector 160. Method 900 continues from step 902 to step 904 where communication device 106 disassembles the communication to ascertain the communication's "header" information, such as the port number.

Method 900 continues from step 904 to step 906, where the intrusion detector 160 compares the communication's "header" information with entries in the list 170 of attack signatures, and passes to decision block 910. If the information in the incoming communication does not match an entry in the list 170 (e.g. the port number of the communication), control passes to step 912 and the communication is routed to its intended destination. However, if the information in the incoming communication matches an entry in the list 170, control passes to step 916 where the communication's body is disassembled. Control then passes to step 918.

At step 918, the communication body is compared to the corresponding body portions (message and content) on the list 170 of attack signatures, and control passes to decision 919. If the communication's body does not match any entries on the list, no action for this type of communication is indicated and control passes to step 912, where the communication is routed to its intended destination. If the communication's body matches an entry on the list, then control passes to step 920 where the priority for the list entry is examined and determined. Control passes to decision 922.

At decision 922, if the entry has a high priority, a high priority action is taken at step 926. For example, a high priority action may entail terminating the communication locally and sending an alert to the remote monitoring center. At decision 922 if the entry does not have a high priority, control passes to decision 924. At decision 924 if the entry has a low priority, a low priority action is taken at step 928. For example, a low priority action may only entail the transmission of an alert to the remote monitoring center without any further local action.

After determining the appropriate actions for high and low priority events at steps 926 and 928, control passes to step 930, where the violated rule is transmitted to the remote monitoring center (RMC) for logging or other appropriate action at the RMC. In the disclosed embodiment, the violated rule constitutes information indicative of the communication received, including port number, message body, message content, and any other information associated with the communication that the RMC may wish to log and inspect. Preferably, the violated rule is transmitted by encapsulating the communication in a TCP/IP packet addressed to the RMC, and transmitting the encapsulated communication via an encrypted channel.

Figure 11:
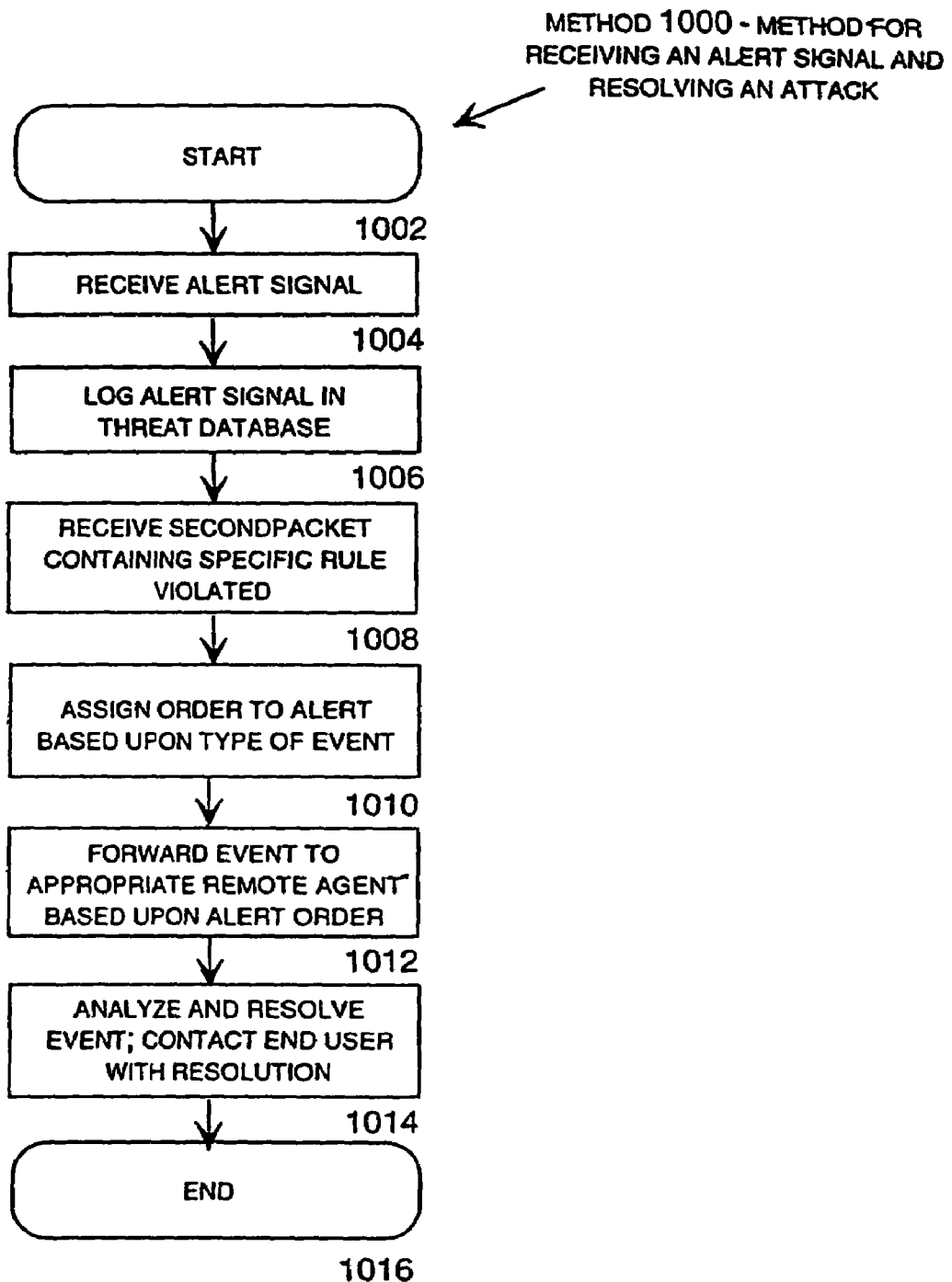
FIG. 11 is a flow diagram showing an illustrative method for receiving an alert signal and resolving an attack.

Now referring to FIG. 11, an illustrative method 1000 for receiving alert signals and resolving attacks will be described. Method 1000 is carried out as steps within the RMC 130 in the disclosed embodiment of the invention.

Method 1000 begins at step 1004, where the RMC 130 receives an alert signal from a communication device 106 that has detected a threat or attack as described in connection with FIG. 10. Method 1000 continues from step 1004 to step 1006, where the monitoring engine 114 of RMC 130 records or logs the alert signal in a threat database 124. Based upon provisions of the user's monitoring agreement (i.e., a predetermined arrangement between a user and the operator of the RMC 130) the threat database 124 may comprise multiple databases, such as a high threat database and a low threat database. In an embodiment of the present invention, the alert signal contains priority information indicative of the seriousness of the attack. Based upon this priority information, the communication is stored in the corresponding threat database.

In addition, reception of an alert signal primes the RMC 130 into taking timely and effective action in response to possible attacks. For example, the reception of an alert signal may initiate RMC 130 into obtaining bandwidth, apportioning memory space, and scheduling an available agent 126 to handle the incident. Those skilled in the art will understand that the described two-part method of communicating information about an attack advantageously sets up the RMC to handle the threat incident expeditiously, by (1) receiving and logging the alert signal automatically, (2) determining the seriousness of the attack, and (3) prioritizing and queuing the most serious threats for handling by one of the remote agents, in an order determined by agent availability and seriousness of the attack.

Method 1000 then continues from step 1006 to step 1008, where monitoring engine 114 receives the second packet from communication device 106 notifying it of the specific intrusion rule that was violated. Method 1000 proceeds to step 1010, where monitoring engine 114 assigns an order preference to the attack based upon the assigned priority, rule violated, and predefined user response policies.

In accordance with an illustrative embodiment of the invention, predefined user response policies may depend wholly on the user's preferences. For example, an organization that employs the UNIX operating system on their computers may be concerned about tracking ROOT logins (i.e., login attempts as ROOT) as potential attacks. This would especially be true if that organization restricted ROOT logins to select persons and/or if the organization seldom utilized ROOT logins. On the other hand, a firm that employs Microsoft Corporation's WINDOWS 98™ operating system may be less concerned about ROOT login attempts since ROOT logins are non-functional on those systems.

From step 1008, method 1000 proceeds to step 1010, where monitoring engine 114 forwards the communication to one or more of the remote agents 126a-126n based upon the assigned order.

Method 1000 continues to step 1012 where one or more of the remote agents 126a-126n analyze the received communication and provide an appropriate resolution, such as terminating the communication and/or modifying the security options of communication device 106. The reader should appreciate that appropriate resolutions may also comprise low tech responses, such as contacting the intrusion source. Method 1000 then ends at step 1016.

In view of the foregoing, it will be appreciated that the present invention provides methods and systems for remotely configuring and monitoring a communication device. It should be understood that the foregoing relates only to specific embodiments of the present invention, and that numerous changes may be made therein without departing from the spirit and scope of the invention as defined by the following claims.

What is claimed is:

1. A method for remotely monitoring each of a plurality of network intrusion protection systems with a remote monitoring center, the method comprising:
    transmitting a configuration file from the remote monitoring center to configure each network intrusion prevention system;
    configuring each network intrusion prevention system with a respective configuration file;
    determining whether a communication represents a security risk with each network intrusion prevention system and after being configured and without control from the remote monitoring center and independently of the remote monitoring center, each network intrusion prevention system comprising a firewall, an intrusion detector, and a remote monitoring controller communication module that couples the network intrusion prevention system to the remote monitoring center;
    blocking a communication from passing to a computer network with each network intrusion prevention system if the communication meets certain rules;
    generating an alert signal by each network intrusion prevention system in response to a determination by a respective network intrusion system that the communication represents a security risk;
    sending each alert signal to the remote monitoring center;
    monitoring each network intrusion prevention system with the remote monitoring center for issuance of an alert signal by a respective network intrusion prevention system in response to a determination by a respective network intrusion system that the communication represents a security risk; and
    determining with the remote monitoring center whether a respective network intrusion prevention system has sent a request to customize its configuration after a respective network intrusion prevention system has received its configuration file from the remote monitoring center, the request to customize comprising at least one security parameter, each security parameter comprising at least one of severity and attack event type.

2. The method of claim 1, further comprising generating a configuration file with the remote monitoring center, the configuration file governing intrusion protection operations for each network intrusion prevention system.

3. The method of claim 2, wherein generating the configuration file with the remote monitoring center further comprises generating the configuration file in response to selection of at least one of one or more security policy options by a respective network intrusion prevention system.

4. The method of claim 1, further comprising receiving at the remote monitoring center a first transmission comprising a first identification number and a network address associated with one of a plurality of network intrusion prevention systems monitored by the remote monitoring center.

5. The method of claim 4, further comprising storing the identification number and network address for each network intrusion prevention system in a database at the remote monitoring center.

6. The method of claim 5, further comprising receiving at the remote monitoring center a second identification number during a second transmission from each network intrusion prevention system.

7. The method of claim 6, further comprising comparing the second identification number with the first identification number at the remote monitoring center and, in response to a match between the first identification number and second identification number, identifying a plurality of security policy options that are selectable by a respective network intrusion prevention system.

8. A method for remotely monitoring a plurality of network intrusion prevention systems with a remote monitoring center, comprising the steps of:
    transmitting one or more configuration files from the remote monitoring center to configure each network intrusion prevention system;
    configuring each network intrusion prevention system with a respective configuration file;
    determining whether a communication represents a security risk with each network intrusion prevention system independently of the remote monitoring center after being configured and without control from the remote monitoring center,
    issuing an alert signal with each network intrusion prevention system in response to a determination by a respective network intrusion system that the communication represents a security risk;
    terminating a communication with each network intrusion prevention system in response to a determination by a respective network intrusion prevention system that the communication represents a security risk;
    monitoring the network intrusion prevention systems with the remote monitoring center to detect an issuance of the alert signal from one of the network intrusion prevention systems; and
    determining with the remote monitoring center whether a respective network intrusion prevention system has sent a request to customize its configuration after a respective network intrusion prevention system has received its configuration file from the remote monitoring center, the request to customize comprising at least one security parameter, each security parameter comprising at least one of severity and attack event type.

9. The method of claim 8, further comprising:
    presenting security policy options with the remote monitoring center, and
    receiving a selection of one or more of the security policy options from each of the network intrusion prevention systems.

10. The method of claim 8, further comprising generating a configuration file with the remote monitoring center in response to selection of the security policy options by each of the network intrusion prevention systems.

11. The method of claim 8, wherein each network intrusion prevention system comprises a firewall, an intrusion detector, and a remote monitoring controller communication module, the remote monitoring controller communication module being coupled to the remote monitoring center.

12. The method of claim 8, wherein each network intrusion prevention system processes a communication carried by a distributed computer network and intended for delivery to a computer coupled to a computer network to determine whether the communication represents a security risk to the computer network in accordance with the configuration file.

13. The method of claim 8, further comprising
receiving the alert signal with the remote monitoring center; and
forwarding the alert signal to a remote agent associated with a service provider, wherein the alert signal provides an advisory of the security risk faced by the network intrusion prevention system that issued the alert signal.

14. The method of claim 8, further comprising the steps of:
assigning a priority to each alert signal upon receipt of each alert signal at the remote monitoring center; and
forwarding each alert signal to a remote agent according to the assigned priority.

15. A system for remotely monitoring the security status of a plurality of computer networks comprising:
a plurality of network intrusion prevention systems, each network intrusion prevention system reads a configuration file stored in a computer readable medium that is received from a remote monitoring center to configure each network intrusion prevention system, each network intrusion system being operative to process a communication carried by a distributed computer network and intended for delivery to a computer coupled to a corresponding computer network to determine whether the communication represents a security risk to the computer network after receiving the configuration file from the remote monitoring center, and
wherein each network intrusion prevention system is further operative after receiving the configuration file to block the communication from passage to the computer network by terminating the communication and to transmit an alert signal via the distributed computer network in response to a determination by the network intrusion prevention system that the communication represents a security risk, each network intrusion prevention system operative to make the determination that the communication represents a security risk independently after being configured with the configuration file stored on the computer readable medium and without control of a remote monitoring center, and
the remote monitoring center coupled to the distributed computer network and operative to monitor the security status of each one of a plurality of computer networks based upon status information transmitted by a corresponding network intrusion prevention system, the remote monitoring center determining whether a respective network intrusion prevention system has sent a request to customize its configuration after a respective network intrusion prevention system has received its configuration file from the remote monitoring center, the request to customize comprising at least one security parameter, each security parameter comprising at least one of severity and attack event type.

16. The system of claim 15, wherein each network intrusion prevention system comprises a firewall, an intrusion detector, and a remote monitoring controller communication module for coupling a respective intrusion detection system to the remote monitoring center.

17. The system of claim 15, wherein each network intrusion prevention system is coupled in-line and between computer networks associated one or more entities and a distributed computer network that is not associated with any of the entities.

18. The system of claim 15, wherein the remote monitoring center is responsive to receipt of the alert signal transmitted by any one of the network intrusion prevention systems to perform an analysis of the alert signal and to recommend action based on the analysis of the alert signal.

19. The system of claim 18, wherein the recommended action is presented to an entity associated with the network intrusion prevention system that issued the alert signal, the responsive action being delivered via one of a Web server, an e-mail message, a telephone, and a pager.

20. The system of claim 15, wherein each network intrusion prevention system comprises a firewall, an intrusion detector, and a remote monitoring controller communication module, the remote monitoring controller communication module managing communications with the remote monitoring center.

* * * * *